(12) United States Patent
Yang et al.

(10) Patent No.: US 11,532,420 B2
(45) Date of Patent: Dec. 20, 2022

(54) THIN FILM INDUCTOR AND POWER CONVERSION CIRCUIT

(71) Applicant: Huawei Technologies Co., Ltd., Shenzhen (CN)

(72) Inventors: Heqian Yang, Shenzhen (CN); Yongfa Zhu, Shenzhen (CN); Xiaolong Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1195 days.

(21) Appl. No.: 16/015,930

(22) Filed: Jun. 22, 2018

(65) Prior Publication Data

US 2018/0301270 A1 Oct. 18, 2018

Related U.S. Application Data

(63) Continuation of application No. PCT/CN2016/106889, filed on Nov. 23, 2016.

(30) Foreign Application Priority Data

Apr. 20, 2016 (CN) .......................... 201610248079.9

(51) Int. Cl.
*H01F 3/14* (2006.01)
*H01F 27/24* (2006.01)
(Continued)

(52) U.S. Cl.
CPC ............... *H01F 27/24* (2013.01); *H01F 3/14* (2013.01); *H01F 17/00* (2013.01); *H01F 17/04* (2013.01);
(Continued)

(58) Field of Classification Search
CPC . H01F 27/24; H01F 3/14; H01F 17/00; H01F 17/04; H01F 27/245;
(Continued)

(56) References Cited

U.S. PATENT DOCUMENTS 4,531,108 A * 7/1985 Brandes ................... H01F 27/38
336/215
6,583,701 B2 6/2003 Sun et al.
(Continued)

FOREIGN PATENT DOCUMENTS

CN 102197446 A 9/2011
CN 103489569 A 1/2014
(Continued)

OTHER PUBLICATIONS

Machine Translation and Abstract of Chinese Publication No. CN103489569, Jan. 1, 2014, 8 pages.
(Continued)

*Primary Examiner* — Mang Tin Bik Lian
(74) *Attorney, Agent, or Firm* — Conley Rose, P.C.

(57) ABSTRACT

A thin film inductor is disclosed, which includes a thin film magnetic core. The thin film magnetic core includes at least one magnetic thin film. In each magnetic thin film, at least one type-1 gap is provided. A length direction of the type-1 gap is parallel to a direction of hard magnetization of the magnetic thin film. If the thin film magnetic core comprises at least two magnetic thin films, the at least two magnetic thin films are laminated and overlap each other. A sum of widths of all type-1 gaps in each magnetic thin film is the same.

16 Claims, 9 Drawing Sheets

(51) Int. Cl.
*H02M 3/155* (2006.01)
*H01F 17/00* (2006.01)
*H01F 27/30* (2006.01)
*H01F 27/38* (2006.01)
*H01F 17/04* (2006.01)
*H01F 27/245* (2006.01)
*H01F 27/28* (2006.01)
*H01F 41/02* (2006.01)

(52) U.S. Cl.
CPC ....... *H01F 27/245* (2013.01); *H01F 27/2804* (2013.01); *H01F 27/30* (2013.01); *H01F 27/306* (2013.01); *H01F 27/38* (2013.01); *H01F 41/0206* (2013.01); *H02M 3/155* (2013.01)

(58) Field of Classification Search
CPC .... H01F 27/2804; H01F 27/30; H01F 27/306; H01F 27/38; H01F 41/0206; H01F 2027/2809; H01F 27/25; H01F 17/0006; H01F 17/045; H01F 2017/0066; H02M 3/155

See application file for complete search history.

(56) References Cited

U.S. PATENT DOCUMENTS

| | | | |
|---|---|---|---|
| 2010/0103585 A1 | 4/2010 | Mao et al. | |
| 2010/0328007 A1* | 12/2010 | Witzani | H01F 3/14 336/178 |
| 2011/0063065 A1 | 3/2011 | Hugues Douglas et al. | |
| 2011/0279214 A1 | 11/2011 | Lee et al. | |
| 2012/0229118 A1* | 9/2012 | Kurita | H01F 27/2895 336/178 |
| 2012/0326831 A1* | 12/2012 | Suzuki | H01F 27/263 336/233 |
| 2013/0176093 A1* | 7/2013 | Summer | H01F 27/28 336/73 |
| 2014/0027879 A1 | 1/2014 | Weyers et al. | |
| 2014/0043127 A1* | 2/2014 | Worek | H01F 27/38 336/178 |
| 2014/0203398 A1 | 7/2014 | Sturcken | |
| 2014/0347157 A1 | 11/2014 | Pulugurtha et al. | |
| 2016/0126008 A1* | 5/2016 | Sturcken | H01F 41/02 336/200 |
| 2016/0372248 A1* | 12/2016 | Pradhan | H01F 3/10 |
| 2017/0309395 A1* | 10/2017 | Shiraki | B60L 50/13 |

FOREIGN PATENT DOCUMENTS

| | | |
|---|---|---|
| CN | 103918042 A | 7/2014 |
| CN | 104637659 A | 5/2015 |
| CN | 204834287 U | 12/2015 |
| CN | 105761880 A | 7/2016 |
| JP | 2005223210 A | 8/2005 |

OTHER PUBLICATIONS

Machine Translation and Abstract of Chinese Publication No. CN104637659, May 20, 2015, 27 pages.
Machine Translation and Abstract of Chinese Publication No. CN105761880, Jul. 13, 2016, 48 pages.
Machine Translation and Abstract of Chinese Publication No. CN204834287, Dec. 2, 2015, 9 pages.
Machine Translation and Abstract of Japanese Publication No. JP2005223210, Aug. 18, 2005, 9 pages.
Foreign Communication From A Counterpart Application, Chinese Application No. 201610248079.9, Chinese Office Action dated May 22, 2017, 3 pages.
Foreign Communication From A Counterpart Application, Chinese Application No. 201610248079.9, Chinese Search Report dated May 12, 2017, 2 pages.
Foreign Communication From A Counterpart Application, PCT Application No. PCT/CN2016/106889, English Translation of International Search Report dated Mar. 8, 2017, 2 pages.
Foreign Communication From A Counterpart Application, European Application No. 16899255.0, Extended European Search Report dated Sep. 19, 2018, 14 pages.

* cited by examiner

THIN FILM INDUCTOR AND POWER CONVERSION CIRCUIT

CROSS-REFERENCE TO RELATED APPLICATIONS

This application is a continuation of International application Ser. No. PCT/CN2016/106889 filed on Nov. 23, 2016, which claims priority to Chinese Patent Application No. 201610248079.9 filed on Apr. 20, 2016, both of which are hereby incorporated by reference in their entireties.

TECHNICAL FIELD

This application relates to the circuit field, and more specifically, to a thin film inductor and a power conversion circuit.

BACKGROUND

A power conversion system for power on-chip is developing toward miniaturization. An inductor, as a main device in the power conversion system, has a relatively large volume, and therefore can be hardly integrated into a processor. Currently, a high-frequency silicon-based copper magnetic copper (CMC) magnetic film inductor is already known. A thin film magnetic core of this inductor is formed by a plurality of laminated magnetic thin films, and its shape may be a closed square shape.

However, due to anisotropy of the magnetic thin films, the magnetic thin films have different magnetic properties in different directions, and have great differences. If an inductor is designed in a direction of hard flux circulation, in a direction of easy flux circulation in a formed magnetic core structure, magnetic permeability is relatively large, and a magnetic core is easily saturated. Magnetic core saturation causes the magnetic permeability to be zero, causes an inductance to decrease sharply, causes a current to increase sharply, and even burns out a device in a worse case.

In addition, because normal working currents include a direct current (DC) and an alternating current, and a DC flux and an alternating current flux that are generated are circulated in a closed iron core, the alternating current flux in the direction of hard flux circulation is intensified, and a problem that the magnetic core is easily saturated is also caused.

SUMMARY

This application provides a thin film inductor and a power conversion circuit to resolve a problem that a magnetic core of a magnetic thin film material is easily saturated.

According to a first aspect, this application provides a thin film inductor, where the thin film inductor includes a thin film magnetic core, the thin film magnetic core includes a plurality of magnetic cylinders, a first end portion, and a second end portion opposite to the first end portion, the plurality of magnetic cylinders are separated from each other, the plurality of magnetic cylinders are all rod-shaped, one end of each magnetic cylinder in the plurality of magnetic cylinders is in contact with the first end portion, and the other end thereof is in contact with the second end portion; the plurality of magnetic cylinders include at least two winding magnetic cylinders and one non-winding magnetic cylinder, and the non-winding magnetic cylinder is located on one side of the at least two winding magnetic cylinders; or the plurality of magnetic cylinders include at least two winding magnetic cylinders and two non-winding magnetic cylinders, and the at least two winding magnetic cylinders are located between the two non-winding magnetic cylinders; the thin film magnetic core includes at least one magnetic thin film, and in each magnetic thin film, at least one type-1 gap is provided in an area located at the first end portion and the second end portion and located between two adjacent winding magnetic cylinders, where a length direction of the type-1 gap is parallel to a direction of hard magnetization of the magnetic thin film, the type-1 gap passes through the area of the magnetic thin film located at the first end portion or the second end portion in the length direction of the type-1 gap, and a width $w_1$ of the type-1 gap is less than or equal to 100 micrometers; and when the thin film magnetic core includes at least two magnetic thin films, the at least two magnetic thin films are laminated and overlap each other, and a sum of widths of all type-1 gaps in each magnetic thin film is the same.

A winding magnetic cylinder is a magnetic cylinder that has a winding. A non-winding magnetic cylinder is a magnetic cylinder that does not have a winding.

Because the type-1 gap is provided in the area between the adjacent winding magnetic cylinders at the first end portion or the second end portion (namely, a direction of easy magnetization), magnetic permeability in the direction of easy magnetization is reduced, and the magnetic core is not easily saturated. In addition, because the non-winding magnetic cylinder is connected to the winding magnetic cylinder in parallel to divert a part of a flux in the winding magnetic cylinder in a direction of a hard magnetization axis to the non-winding magnetic cylinder, a risk of magnetic core saturation in the winding magnetic cylinder is reduced.

Optionally, the width $w_1$ of the type-1 gap is less than or equal to 10 micrometers.

Through a simulation experiment, it is found that when the width $w_1$ of the type-1 gap is less than or equal to 10 micrometers, an effect of reducing magnetic permeability and avoiding magnetic core saturation in the thin film magnetic core in the direction of easy magnetization is the best.

Optionally, the first end portion is parallel to the second end portion.

Optionally, the plurality of magnetic cylinders are parallel to each other.

Optionally, each magnetic cylinder is vertical to the first end portion of the thin film magnetic core.

Optionally, distances between every two adjacent magnetic cylinders are the same.

Optionally, the thin film inductor further includes windings, a quantity of the windings is equal to a quantity of the at least two winding magnetic cylinders, each winding winds around one winding magnetic cylinder, and winding directions of all the windings are the same.

Optionally, if the thin film magnetic core includes at least two magnetic thin films, each magnetic thin film is made of a same material.

With reference to the first aspect, in a first possible implementation of the first aspect, if the thin film magnetic core includes at least two magnetic thin films, the at least two magnetic thin films include a first magnetic thin film and a second magnetic thin film, a quantity of type-1 gaps in the first magnetic thin film is the same as a quantity of type-1 gaps in the second magnetic thin film, and the type-1 gaps in the first magnetic thin film overlap the type-1 gaps in corresponding positions in the second magnetic thin film.

With reference to the first aspect, in a second possible implementation of the first aspect, if the thin film magnetic core includes at least two magnetic thin films, each of the at least two magnetic thin films includes a same quantity of type-1 gaps, and the type-1 gaps in corresponding positions included in any two magnetic thin films in the at least two magnetic thin films overlap each other.

Because the type-1 gaps are provided in the same positions in various layers, mask fabrication is facilitated, and costs are reduced.

With reference to the foregoing possible implementations of the first aspect, in a third possible implementation of the first aspect, when the plurality of magnetic cylinders include one non-winding magnetic cylinder, at least one type-2 gap is provided in the non-winding magnetic cylinder; or when the plurality of magnetic cylinders include two non-winding magnetic cylinders, at least one type-2 gap is provided in the two non-winding magnetic cylinders; where a width $w_2$ of the type-2 gap is less than or equal to one millimeter.

The type-2 gap is provided in the non-winding magnetic cylinder to increase magnetic resistance of the non-winding magnetic cylinder, reduce magnetic permeability, and avoid magnetic core saturation in the non-winding magnetic cylinder. In addition, a value of magnetic resistance can be controlled by adjusting a size of the type-2 gap, and further, flux distribution in various magnetic cylinders (including the winding magnetic cylinders and the non-winding magnetic cylinders) is adjusted to control a coupling factor between the winding magnetic cylinders (namely, inductances in various phases).

Optionally, the width $w_2$ of the type-2 gap satisfies 10 micrometers$\leq w_2 \leq$50 micrometers.

Through a simulation experiment, it is found that when the width $w_2$ of the type-2 gap satisfies 10 micrometers$\leq w_2 \leq$50 micrometers, an effect of reducing magnetic permeability, avoiding magnetic core saturation in the non-winding magnetic cylinder, and controlling the coupling factor is the best.

With reference to the foregoing possible implementations of the first aspect, in a fourth possible implementation of the first aspect, if the thin film magnetic core includes at least two magnetic thin films, the at least two magnetic thin films include a first magnetic thin film and a second magnetic thin film, a quantity of type-2 gaps in the first magnetic thin film is the same as a quantity of type-2 gaps in the second magnetic thin film, and the type-2 gaps in the first magnetic thin film overlap the type-2 gaps in corresponding positions in the second magnetic thin film.

With reference to the foregoing possible implementations of the first aspect, in a fifth possible implementation of the first aspect, if the thin film magnetic core includes at least two magnetic thin films, each of the at least two magnetic thin films includes a same quantity of type-2 gaps, and the type-2 gaps in corresponding positions included in any two magnetic thin films in the at least two magnetic thin films overlap each other.

Because the type-2 gaps are provided in the same positions in various layers, mask fabrication is facilitated, and costs are reduced.

According to a second aspect, this application provides a thin film inductor, where the thin film inductor includes a thin film magnetic core, the thin film magnetic core includes a plurality of magnetic cylinders, a first end portion, and a second end portion opposite to the first end portion, the plurality of magnetic cylinders are separated from each other, the plurality of magnetic cylinders are all rod-shaped, one end of each magnetic cylinder in the plurality of magnetic cylinders is in contact with the first end portion, and the other end thereof is in contact with the second end portion; the plurality of magnetic cylinders include two winding magnetic cylinders and at least one non-winding magnetic cylinder, and the at least one non-winding magnetic cylinder is located between the two winding magnetic cylinders; the thin film magnetic core includes at least one magnetic thin film, and in each magnetic thin film, at least one type-3 gap is provided in an area located at the first end portion and the second end portion and located between a winding magnetic cylinder and a non-winding magnetic cylinder that are adjacent, where a length direction of the type-3 gap is parallel to a direction of hard magnetization of the magnetic thin film, the type-3 gap passes through the area of the magnetic thin film located at the first end portion or the second end portion in the length direction of the type-3 gap, and a width $w_3$ of the type-3 gap is less than or equal to 100 micrometers; and if the thin film magnetic core includes at least two magnetic thin films, the at least two magnetic thin films are laminated and overlap each other, and a sum of widths of all type-3 gaps in each magnetic thin film is the same.

Because the type-3 gap is provided in the area between the winding magnetic cylinder and the non-winding magnetic cylinder that are adjacent at the first end portion and the second end portion, magnetic permeability in a direction of easy magnetization is reduced, and the magnetic core is not easily saturated. In addition, because the non-winding magnetic cylinder is connected to the winding magnetic cylinder in parallel to divert a part of a flux in the winding magnetic cylinder in the direction of hard magnetization to the non-winding magnetic cylinder, a risk of magnetic core saturation in the winding magnetic cylinder is reduced.

Optionally, in each magnetic thin film, at least two type-3 gaps are provided in the area located at the first end portion and the second end portion and located between the winding magnetic cylinder and the non-winding magnetic cylinder that are adjacent.

Optionally, the width $w_3$ of the type-3 gap is less than or equal to 10 micrometers.

Through a simulation experiment, it is found that when the width $w_3$ of the type-3 gap is less than or equal to 10 micrometers, an effect of reducing magnetic permeability and avoiding magnetic core saturation in the thin film magnetic core in the direction of easy magnetization is the best.

Optionally, the first end portion is parallel to the second end portion.

Optionally, the plurality of magnetic cylinders are parallel to each other.

Optionally, each magnetic cylinder is vertical to the first end portion of the thin film magnetic core.

Optionally, distances between every two adjacent magnetic cylinders are the same.

Optionally, the thin film inductor further includes windings, a quantity of the windings is equal to a quantity of the at least two winding magnetic cylinders, each winding winds around one winding magnetic cylinder, and winding directions of all the windings are the same.

Optionally, if the thin film magnetic core includes at least two magnetic thin films, each magnetic thin film is made of a same material.

With reference to the second aspect, in a first possible implementation of the second aspect, if the thin film magnetic core includes at least two magnetic thin films, the at least two magnetic thin films include a first magnetic thin film and a second magnetic thin film, a quantity of type-3 gaps in the first magnetic thin film is the same as a quantity of type-3 gaps in the second magnetic thin film, and the type-3 gaps in the first magnetic thin film overlap the type-3 gaps in corresponding positions in the second magnetic thin film.

With reference to the second aspect, in a second possible implementation of the second aspect, if the thin film magnetic core includes at least two magnetic thin films, each of the at least two magnetic thin films includes a same quantity of type-3 gaps, and the type-3 gaps in corresponding positions included in any two magnetic thin films in the at least two magnetic thin films overlap each other.

Because the type-3 gaps are provided in the same positions in various layers, mask fabrication is facilitated, and costs are reduced.

With reference to the foregoing possible implementations of the second aspect, in a third possible implementation of the second aspect, when the plurality of magnetic cylinders include one non-winding magnetic cylinder, at least one type-4 gap is provided in the non-winding magnetic cylinder; or when the plurality of magnetic cylinders include two non-winding magnetic cylinders, at least one type-4 gap is provided in the two non-winding magnetic cylinders; where a width $w_4$ of the type-4 gap is less than or equal to one millimeter.

The type-4 gap is provided in the non-winding magnetic cylinder to increase magnetic resistance of the non-winding magnetic cylinder, reduce magnetic permeability, and avoid magnetic core saturation in the non-winding magnetic cylinder. In addition, a value of magnetic resistance can be controlled by adjusting a size of the type-4 gap, and further, flux distribution in various magnetic cylinders (including the winding magnetic cylinders and the non-winding magnetic cylinders) is adjusted to control a coupling factor between the winding magnetic cylinders (namely, inductances in various phases).

Optionally, the width $w_4$ of the type-4 gap satisfies 10 micrometers$\leq w_4 \leq$50 micrometers.

Through a simulation experiment, it is found that when the width $w_4$ of the type-4 gap satisfies 10 micrometers$\leq w_4 \leq$50 micrometers, an effect of reducing magnetic permeability, avoiding magnetic core saturation in the non-winding magnetic cylinder, and controlling the coupling factor is the best.

With reference to the foregoing possible implementations of the second aspect, in a fourth possible implementation of the second aspect, if the thin film magnetic core includes at least two magnetic thin films, the at least two magnetic thin films include a first magnetic thin film and a second magnetic thin film, a quantity of type-4 gaps in the first magnetic thin film is the same as a quantity of type-4 gaps in the second magnetic thin film, and the type-4 gaps in the first magnetic thin film overlap the type-4 gaps in corresponding positions in the second magnetic thin film.

With reference to the foregoing possible implementations of the second aspect, in a fifth possible implementation of the second aspect, if the thin film magnetic core includes at least two magnetic thin films, each of the at least two magnetic thin films includes a same quantity of type-4 gaps, and the type-4 gaps in corresponding positions included in any two magnetic thin films in the at least two magnetic thin films overlap each other.

Because the type-4 gaps are provided in the same positions in various layers, mask fabrication is facilitated, and costs are reduced.

According to a third aspect, this application provides a thin film inductor, where the thin film inductor includes a thin film magnetic core, the thin film magnetic core includes a plurality of magnetic cylinders, a first end portion, and a second end portion opposite to the first end portion, the plurality of magnetic cylinders are separated from each other, the plurality of magnetic cylinders are all rod-shaped, one end of each magnetic cylinder in the plurality of magnetic cylinders is in contact with the first end portion, and the other end thereof is in contact with the second end portion; the plurality of magnetic cylinders include at least two winding magnetic cylinders and at least one non-winding magnetic cylinder; the thin film magnetic core includes at least one magnetic thin film, and in each magnetic thin film, at least one type-1 gap is provided in an area located at the first end portion and the second end portion and located between two adjacent winding magnetic cylinders, where a length direction of the type-1 gap is parallel to a direction of hard magnetization of the magnetic thin film, the type-1 gap passes through the first end portion or the second end portion of the magnetic thin film in the length direction of the type-1 gap, and a width $w_1$ of the type-1 gap is less than or equal to 100 micrometers; or in each magnetic thin film, at least one type-3 gap is provided in an area located at the first end portion and the second end portion and located between a winding magnetic cylinder and a non-winding magnetic cylinder that are adjacent, where a length direction of the type-3 gap is parallel to a direction of hard magnetization of the magnetic thin film, the type-3 gap passes through the first end portion or the second end portion of the magnetic thin film in the length direction of the type-3 gap, and a width $w_3$ of the type-3 gap is less than or equal to 100 micrometers; and if the thin film magnetic core includes at least two magnetic thin films, the at least two magnetic thin films are laminated and overlap each other, and a sum of widths of all type-1 gaps in each magnetic thin film is the same.

Because the type-1 gap is provided in the area between the adjacent winding magnetic cylinders at the first end portion and the second end portion, or the type-3 gap is provided in the area between the winding magnetic cylinder and the non-winding magnetic cylinder that are adjacent at the first end portion and the second end portion, magnetic permeability in a direction of easy magnetization is reduced, and the magnetic core is not easily saturated. In addition, because the non-winding magnetic cylinder is connected to the winding magnetic cylinder in parallel to divert a part of a flux in the winding magnetic cylinder in the direction of hard magnetization to the non-winding magnetic cylinder, a risk of magnetic core saturation in the winding magnetic cylinder is reduced.

Optionally, the width $w_1$ of the type-1 gap is less than or equal to 10 micrometers, or the width $w_3$ of the type-3 gap is less than or equal to 10 micrometers.

Through a simulation experiment, it is found that when the width of the type-1 gap or the type-3 gap is less than or equal to 10 micrometers, an effect of reducing magnetic permeability and avoiding magnetic core saturation in the thin film magnetic core in the direction of easy magnetization is the best.

With reference to the third aspect, in a first possible implementation of the third aspect, if the thin film magnetic core includes at least two magnetic thin films, the at least two magnetic thin films include a first magnetic thin film and a second magnetic thin film, a quantity of type-1 gaps in the first magnetic thin film is the same as a quantity of type-1 gaps in the second magnetic thin film, and the type-1 gaps in the first magnetic thin film overlap the type-1 gaps in corresponding positions in the second magnetic thin film.

With reference to the third aspect, in a second possible implementation of the third aspect, if the thin film magnetic core includes at least two magnetic thin films, each of the at least two magnetic thin films includes a same quantity of type-1 gaps, and the type-1 gaps in corresponding positions included in any two magnetic thin films in the at least two magnetic thin films overlap each other.

Because the type-1 gaps are provided in the same positions in various layers, mask fabrication is facilitated, and costs are reduced.

With reference to the foregoing possible implementations of the third aspect, in a third possible implementation of the third aspect, when the plurality of magnetic cylinders include one non-winding magnetic cylinder, at least one type-2 gap is provided in the non-winding magnetic cylinder; or when the plurality of magnetic cylinders include two non-winding magnetic cylinders, at least one type-2 gap is provided in the two non-winding magnetic cylinders; where a width $w_2$ of the type-2 gap is less than or equal to one millimeter.

The type-2 gap is provided in the non-winding magnetic cylinder to increase magnetic resistance of the non-winding magnetic cylinder, reduce magnetic permeability, and avoid magnetic core saturation in the non-winding magnetic cylinder. In addition, a value of magnetic resistance can be controlled by adjusting a size of the type-2 gap, and further, flux distribution in various magnetic cylinders (including the winding magnetic cylinders and the non-winding magnetic cylinders) is adjusted to control a coupling factor between the winding magnetic cylinders (namely, inductances in various phases).

Optionally, the width $w_2$ of the type-2 gap satisfies 10 micrometers≤$w_2$≤50 micrometers.

Through a simulation experiment, it is found that when the width $w_2$ of the type-2 gap satisfies 10 micrometers≤$w_2$<50 micrometers, an effect of reducing magnetic permeability, avoiding magnetic core saturation in the non-winding magnetic cylinder, and controlling the coupling factor is the best.

With reference to the foregoing possible implementations of the third aspect, in a fourth possible implementation of the third aspect, if the thin film magnetic core includes at least two magnetic thin films, the at least two magnetic thin films include a first magnetic thin film and a second magnetic thin film, a quantity of type-2 gaps in the first magnetic thin film is the same as a quantity of type-2 gaps in the second magnetic thin film, and the type-2 gaps in the first magnetic thin film overlap the type-2 gaps in corresponding positions in the second magnetic thin film.

With reference to the foregoing possible implementations of the third aspect, in a fifth possible implementation of the third aspect, if the thin film magnetic core includes at least two magnetic thin films, each of the at least two magnetic thin films includes a same quantity of type-2 gaps, and the type-2 gaps in corresponding positions included in any two magnetic thin films in the at least two magnetic thin films overlap each other.

Because the type-2 gaps are provided in the same positions in various layers, mask fabrication is facilitated, and costs are reduced.

With reference to the third aspect, in a sixth possible implementation of the third aspect, if the thin film magnetic core includes at least two magnetic thin films, the at least two magnetic thin films include a first magnetic thin film and a second magnetic thin film, a quantity of type-3 gaps in the first magnetic thin film is the same as a quantity of type-3 gaps in the second magnetic thin film, and the type-3 gaps in the first magnetic thin film overlap the type-3 gaps in corresponding positions in the second magnetic thin film.

With reference to the third aspect, in a seventh possible implementation of the third aspect, if the thin film magnetic core includes at least two magnetic thin films, each of the at least two magnetic thin films includes a same quantity of type-3 gaps, and the type-3 gaps in corresponding positions included in any two magnetic thin films in the at least two magnetic thin films overlap each other.

Because the type-3 gaps are provided in the same positions in various layers, mask fabrication is facilitated, and costs are reduced.

With reference to the foregoing possible implementations of the third aspect, in an eighth possible implementation of the third aspect, when the plurality of magnetic cylinders include one non-winding magnetic cylinder, at least one type-4 gap is provided in the non-winding magnetic cylinder; or when the plurality of magnetic cylinders include two non-winding magnetic cylinders, at least one type-4 gap is provided in the two non-winding magnetic cylinders; where a width $w_4$ of the type-4 gap is less than or equal to one millimeter.

The type-4 gap is provided in the non-winding magnetic cylinder to increase magnetic resistance of the non-winding magnetic cylinder, reduce magnetic permeability, and avoid magnetic core saturation in the non-winding magnetic cylinder. In addition, a value of magnetic resistance can be controlled by adjusting a size of the type-4 gap, and further, flux distribution in various magnetic cylinders (including the winding magnetic cylinders and the non-winding magnetic cylinders) is adjusted to control the coupling factor between the winding magnetic cylinders (namely, inductances in various phases).

Optionally, the width $w_4$ of the type-4 gap satisfies 10 micrometers≤$w_4$≤50 micrometers.

Through a simulation experiment, it is found that when the width $w_4$ of the type-4 gap satisfies 10 micrometers≤$w_4$≤50 micrometers, the effect of reducing magnetic permeability, avoiding magnetic core saturation in the non-winding magnetic cylinder, and controlling the coupling factor is the best.

With reference to the foregoing possible implementations of the third aspect, in a ninth possible implementation of the third aspect, if the thin film magnetic core includes at least two magnetic thin films, the at least two magnetic thin films include a first magnetic thin film and a second magnetic thin film, a quantity of type-4 gaps in the first magnetic thin film is the same as a quantity of type-4 gaps in the second magnetic thin film, and the type-4 gaps in the first magnetic thin film overlap the type-4 gaps in corresponding positions in the second magnetic thin film.

With reference to the foregoing possible implementations of the third aspect, in a tenth possible implementation of the third aspect, if the thin film magnetic core includes at least two magnetic thin films, each of the at least two magnetic thin films includes a same quantity of type-4 gaps, and the type-4 gaps in corresponding positions included in any two magnetic thin films in the at least two magnetic thin films overlap each other.

Because the type-4 gaps are provided in the same positions in various layers, mask fabrication is facilitated, and costs are reduced.

In some implementations, the thin film material is a high-frequency silicon-based CMC magnetic film inductor.

According to a fourth aspect, this application provides a power conversion circuit, where the power conversion circuit includes a DC power source, at least one switching unit, and at least one induction unit, where the at least one switching unit corresponds to the at least one induction unit on a one-to-one basis, each induction unit is connected to the DC power source by a corresponding switching unit, and each induction unit in the at least one induction unit includes the thin film inductor in any possible implementation of the first aspect to the third aspect.

According to a fifth aspect, this application provides a method for fabricating a thin film inductor, where the fabrication method includes forming at least two lower-layer windings; forming a thin film magnetic core, where the thin film magnetic core includes a plurality of magnetic cylinders, a first end portion, and a second end portion opposite to the first end portion, the plurality of magnetic cylinders are separated from each other, the plurality of magnetic cylinders are all rod-shaped, one end of each magnetic cylinder in the plurality of magnetic cylinders is in contact with the first end portion, and the other end thereof is in contact with the second end portion; the plurality of magnetic cylinders include at least two winding magnetic cylinders and at least one non-winding magnetic cylinder; the thin film magnetic core includes at least one magnetic thin film, and in each magnetic thin film, at least one type-1 gap is provided in an area located at the first end portion and the second end portion and located between two adjacent winding magnetic cylinders, where a length direction of the type-1 gap is parallel to a direction of hard magnetization of the magnetic thin film, the type-1 gap passes through the first end portion or the second end portion of the magnetic thin film in the length direction of the type-1 gap, and a width $w_1$ of the type-1 gap is less than or equal to 100 micrometers; or in each magnetic thin film, at least one type-3 gap is provided in an area located at the first end portion and the second end portion and located between a winding magnetic cylinder and a non-winding magnetic cylinder that are adjacent, where a length direction of the type-3 gap is parallel to a direction of hard magnetization of the magnetic thin film, the type-3 gap passes through the first end portion or the second end portion of the magnetic thin film in the length direction of the type-3 gap, and a width $w_3$ of the type-3 gap is less than or equal to 100 micrometers; and if the thin film magnetic core includes at least two magnetic thin films, the at least two magnetic thin films are laminated and overlap each other, and a sum of widths of all type-1 gaps in each magnetic thin film is the same; and forming at least two upper-layer windings, where the at least two lower-layer windings correspond to the at least two upper-layer windings on a one-to-one basis, the at least two lower-layer windings and the at least two upper-layer windings form at least two windings, the at least two windings wind around the at least two winding magnetic cylinders respectively, the at least two windings correspond to the at least two winding magnetic cylinders on a one-to-one basis, and winding directions of all the windings are the same.

This application provides a thin film inductor and a power conversion circuit to resolve a problem that a magnetic core of a magnetic thin film material is easily saturated.

DESCRIPTION OF EMBODIMENTS

The following clearly describes the technical solutions in the embodiments of this application with reference to the accompanying drawings in the embodiments of this application.

It should be understood that a thin film inductor in an embodiment of this application may be applied to a power conversion system, or may be applied to another circuit. This is not limited in this application.

Figure 1A:
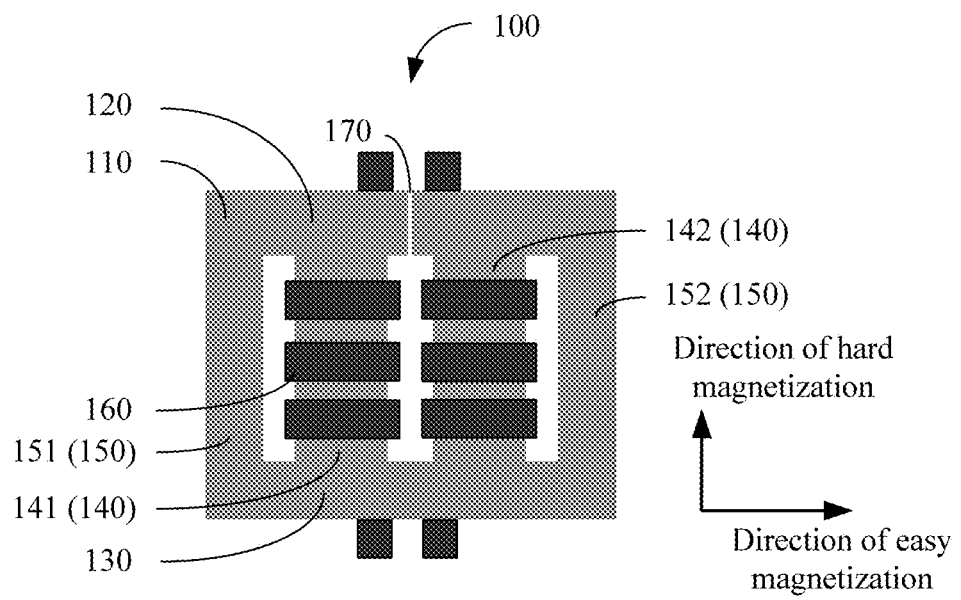
FIG. 1A and FIG. 1B are schematic structural diagrams of a thin film inductor according to an embodiment of this application.
Figure 1B:
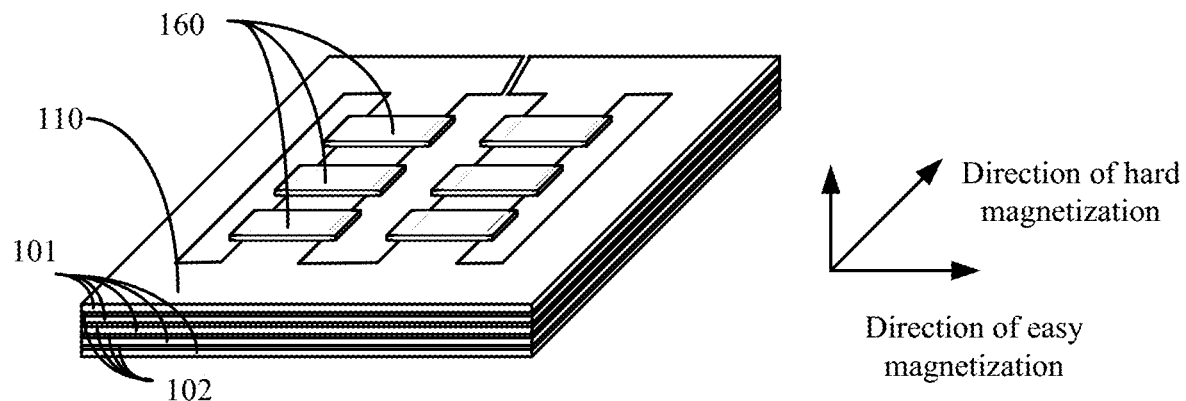

FIG. 1A and FIG. 1B are schematic structural diagrams of a thin film inductor 100 according to an embodiment of this application. FIG. 1A is a top view of the thin film inductor 100 according to this embodiment of this application. FIG. 1B is a cross-sectional view of the thin film inductor 100 according to this embodiment of this application.

As shown in FIG. 1A and FIG. 1B, the thin film inductor 100 includes a thin film magnetic core 110, where the thin film magnetic core includes a plurality of magnetic cylinders, a first end portion 120, and a second end portion 130 opposite to the first end portion 120, the plurality of magnetic cylinders are separated from each other, the plurality of magnetic cylinders are all rod-shaped, one end of each magnetic cylinder in the plurality of magnetic cylinders is in contact with the first end portion 120, and the other end thereof is in contact with the second end portion 130. The plurality of magnetic cylinders include at least two winding magnetic cylinders 140 and at least one non-winding magnetic cylinder 150.

The plurality of magnetic cylinders may include at least two winding magnetic cylinders 140 and two non-winding magnetic cylinders 150, where the at least two winding magnetic cylinders 140 may be located between the two non-winding magnetic cylinders 150. Alternatively, the plurality of magnetic cylinders may include at least two winding magnetic cylinders 140 and one non-winding magnetic cylinder 150, where the non-winding magnetic cylinder 150 may be located on one side of the at least two winding magnetic cylinders 140. Alternatively, the plurality of magnetic cylinders may include two winding magnetic cylinders 140 and at least one non-winding magnetic cylinder 150, where the at least one non-winding magnetic cylinder 150 may be located between the two winding magnetic cylinders 140.

When the plurality of magnetic cylinders include at least two winding magnetic cylinders and one non-winding magnetic cylinder, or when the plurality of magnetic cylinders include at least two winding magnetic cylinders and at least one non-winding magnetic cylinder, the plurality of magnetic cylinders are at least three magnetic cylinders. When the plurality of magnetic cylinders include at least two winding magnetic cylinders and at least two non-winding magnetic cylinders, the plurality of magnetic cylinders are at least four magnetic cylinders.

In this embodiment of this application, the thin film magnetic core includes at least one magnetic thin film, and in each magnetic thin film, at least one type-1 gap is provided in an area located at the first end portion and the second end portion and located between two adjacent winding magnetic cylinders, where a length direction of the type-1 gap is parallel to a direction of hard magnetization of the magnetic thin film, the type-1 gap passes through the first end portion or the second end portion of the magnetic thin film in the length direction of the type-1 gap, and a width $w_1$ of the type-1 gap is less than or equal to 100 micrometers; or in each magnetic thin film, at least one type-3 gap is provided in an area located at the first end portion and the second end portion and located between a winding magnetic cylinder and a non-winding magnetic cylinder that are adjacent, where a length direction of the type-3 gap is parallel to a direction of hard magnetization of the magnetic thin film, the type-3 gap passes through the first end portion or the second end portion of the magnetic thin film in the length direction of the type-3 gap, and a width $w_3$ of the type-3 gap is less than or equal to 100 micrometers.

In addition, if the thin film magnetic core includes at least two magnetic thin films, the at least two magnetic thin films are laminated and overlap each other, and a sum of widths of all type-1 gaps in each magnetic thin film is the same.

The following describes in detail various structures of the thin film inductor and flux circulation in different structures of the thin film inductor according to embodiments of this application.

Still referring to FIG. 1A, the embodiment shown in FIG. 1A shows a case in which the plurality of magnetic cylinders include at least two winding magnetic cylinders and two non-winding magnetic cylinders, and the at least two winding magnetic cylinders are located between the two non-winding magnetic cylinders.

In an embodiment, as shown in FIG. 1A, the plurality of magnetic cylinders include at least two winding magnetic cylinders (141 and 142) and two non-winding magnetic cylinders (151 and 152), and the at least two winding magnetic cylinders (141 and 142) are located between the two non-winding magnetic cylinders (151 and 152).

It should be understood that, the thin film inductor described in this embodiment of this application is described merely as an example, and should not be construed as any limitation on this application, and this application should not be limited thereto. A principle of resolving magnetic core saturation when the plurality of magnetic cylinders include at least two winding magnetic cylinders and one non-winding magnetic cylinder is similar to the described principle of resolving magnetic core saturation when the plurality of magnetic cylinders include at least two winding magnetic cylinders and two non-winding magnetic cylinders in this embodiment of this application.

In this embodiment of this application, due to processing features of the thin film material, the magnetic thin film has a direction of hard flux circulation (marked as a direction of hard magnetization for ease of understanding and description) and a direction of easy flux circulation (marked as a direction of easy magnetization for ease of understanding and description). Because the magnetic core of the magnetic thin film is not saturated quickly in a direction of a hard magnetization axis, in an inductor design, a coil (or a winding) may wind in the direction of the hard magnetization axis (namely, the direction of hard magnetization).

Optionally, the first end portion is parallel to the second end portion.

Optionally, the plurality of magnetic cylinders are parallel to each other.

Optionally, each magnetic cylinder is vertical to the first end portion of the thin film magnetic core.

The thin film inductor 100 shown in FIG. 1A includes two winding magnetic cylinders 141 and 142 and two non-winding magnetic cylinders 151 and 152. The winding magnetic cylinders 141 and 142 are located between the two non-winding magnetic cylinders 151 and 152. In this embodiment of this application, length directions of the at least two winding magnetic cylinders 140 and at least one external magnetic cylinder 150 are the direction of hard magnetization of the magnetic thin film, and the at least two winding magnetic cylinders 140 and at least one non-winding magnetic cylinder 150 are arranged in the direction of easy magnetization of the magnetic thin film.

The thin film magnetic core 110 includes at least one magnetic thin film, and in the at least one magnetic thin film, directions of hard magnetization of any two magnetic thin films are parallel to each other. As shown in FIG. 1B, the thin film magnetic core 110 is formed by the magnetic thin films 101 and insulation layers 102 that are laminated alternately, and a quantity and thicknesses of layers may be determined according to an inductance requirement. In addition, when a total magnetic film thickness is fixed, if a magnetic film is thinner, the quantity of layers is larger, and a generated eddy current loss is smaller.

In each magnetic thin film, at least one type-1 gap 170 is provided in an area located at the first end portion 120 and the second end portion 130 and located between two adjacent winding magnetic cylinders 141 and 142, where a length direction of the type-1 gap 170 is parallel to the direction of hard magnetization of the magnetic thin film, the type-1 gap 170 passes through the area of the magnetic thin film located at the first end portion 120 or the second end portion 130 in the length direction of the type-1 gap 170, and a width $w_1$ of the type-1 gap 170 is less than or equal to 100 micrometers (μm).

The type-1 gap is a gap in an area located at the first end portion or the second end portion and located between two adjacent windings. That is, in each magnetic thin film, at least one type-1 gap is provided in an area located at the first end portion and located between two adjacent winding magnetic cylinders, or in each magnetic thin film, at least one type-1 gap is provided in an area located at the second end portion and located between two adjacent winding magnetic cylinders. That is, at least one type-1 gap may be provided at the first end portion and the second end portion respectively, or at least one type-1 gap may be provided only at the first end portion or the second end portion. This is not limited in this application.

If the thin film magnetic core includes at least two magnetic thin films, the at least two magnetic thin films are laminated and overlap each other, and a sum of widths of all type-1 gaps in each magnetic thin film is the same.

That is, first end portions of the magnetic thin films overlap each other, second end portions of the magnetic thin films overlap each other, at least two winding magnetic cylinders of the magnetic thin films overlap each other, and at least one non-winding magnetic cylinder of the magnetic thin films overlaps each other.

The width $w_1$ of the type-1 gap is less than or equal to 100 micrometers. That is, the type-1 gap can be provided in the area between two adjacent winding magnetic cylinders only when a distance between the adjacent winding magnetic cylinders is greater than 100 micrometers.

Optionally, the width $w_1$ of the type-1 gap is less than or equal to 10 micrometers.

Through a simulation experiment, it is found that when the width $w_1$ of the type-1 gap is less than or equal to 10 micrometers, magnetic resistance of the magnetic thin film in the direction of easy magnetization can be increased effectively, and an effect of reducing magnetic permeability and avoiding magnetic core saturation in the thin film magnetic core in the direction of easy magnetization is the best.

Optionally, distances between every two adjacent magnetic cylinders are the same.

Optionally, the thin film inductor further includes windings, a quantity of the windings is equal to a quantity of the at least two winding magnetic cylinders, each winding winds around one winding magnetic cylinder, and winding directions of all the windings are the same.

Optionally, if the thin film magnetic core includes at least two magnetic thin films, each magnetic thin film is made of a same material.

As an example instead of a limitation, the thin film material is a high-frequency silicon-based CMC magnetic film inductor.

It should be noted that, the foregoing "overlapping", "parallel", and "equal" may be respectively understood as "essentially overlapping", "essentially parallel", and "essentially equal", that is, overlapping, parallel, and equal within a tolerance range and an error range in magnetic thin film processing for a person skilled in the art. Similarly, widths of the type-1 gap, a type-2 gap, a type-3 gap, a type-4 gap, and a type-5 gap that are illustrated earlier and later also should not exclude widths within the tolerance range and the error range in magnetic thin film processing. This may be readily figured out by a person skilled in the art, and therefore shall fall within the protection scope of this application.

Further, connecting a non-winding magnetic cylinder to a winding magnetic cylinder in parallel is equivalent to diverting a part of an alternating current flux in the winding magnetic cylinder to the non-winding magnetic cylinder. DC fluxes generated by windings in non-winding magnetic cylinders are mutually intensified, but DC fluxes generated in winding magnetic cylinders are mutually canceled (distribution and directions of the fluxes in the winding magnetic cylinders and the non-winding magnetic cylinders are described in detail later). Therefore, a risk of magnetic core saturation in a winding magnetic cylinder area can be reduced.

Optionally, if the thin film magnetic core includes at least two magnetic thin films, the at least two magnetic thin films include a first magnetic thin film and a second magnetic thin film, a quantity of type-1 gaps in the first magnetic thin film is the same as a quantity of type-1 gaps in the second magnetic thin film, and the type-1 gaps in the first magnetic thin film overlap the type-1 gaps in corresponding positions in the second magnetic thin film.

Optionally, if the thin film magnetic core includes at least two magnetic thin films, each of the at least two magnetic thin films includes a same quantity of type-1 gaps, and the type-1 gaps in corresponding positions included in any two magnetic thin films in the at least two magnetic thin films overlap each other.

That is, the type-1 gaps in the magnetic thin films may partially or completely overlap each other. Fabrication of the thin film magnetic core, each magnetic thin film may be formed using a mask. In a magnetic thin film formation process, a graph of a magnetic thin film is formed on a silicon wafer through a graph part of the mask. The mask needs to undergo photoetching processing and has very high precision. If the positions of the type-1 gaps in all the magnetic thin films are different, different mask molds need to be used to fabricate different masks corresponding to the positions of the type-1 gaps, and costs are very high. Therefore, the type-1 gaps in all the magnetic thin films may be provided in a same position, and a mask matching each magnetic thin film can be fabricated using one mask mold. This can reduce costs.

Therefore, in the thin film inductor according to this embodiment of this application, the type-1 gap is provided in the area between the adjacent winding magnetic cylinders at the first end portion or the second end portion (namely, the direction of easy magnetization), so that magnetic permeability in the direction of easy magnetization is reduced, and that the magnetic core is not easily saturated. In addition, because the non-winding magnetic cylinder is connected to the winding magnetic cylinder in parallel to divert a part of a flux in the winding magnetic cylinder in the direction of hard magnetization to the non-winding magnetic cylinder, a risk of magnetic core saturation in the winding magnetic cylinder is reduced.

Optionally, when the plurality of magnetic cylinders include one non-winding magnetic cylinder, at least one type-2 gap is provided in the non-winding magnetic cylinder; or when the plurality of magnetic cylinders include two non-winding magnetic cylinders, at least one type-2 gap is provided in the two non-winding magnetic cylinders; where a width $w_2$ of the type-2 gap is less than or equal to one millimeter.

That is, the type-2 gap may be provided in the non-winding magnetic cylinder. At least one type-2 gap may be provided in only one non-winding magnetic cylinder, or at least one type-2 gap may be provided in each non-winding magnetic cylinder.

Figure 2:
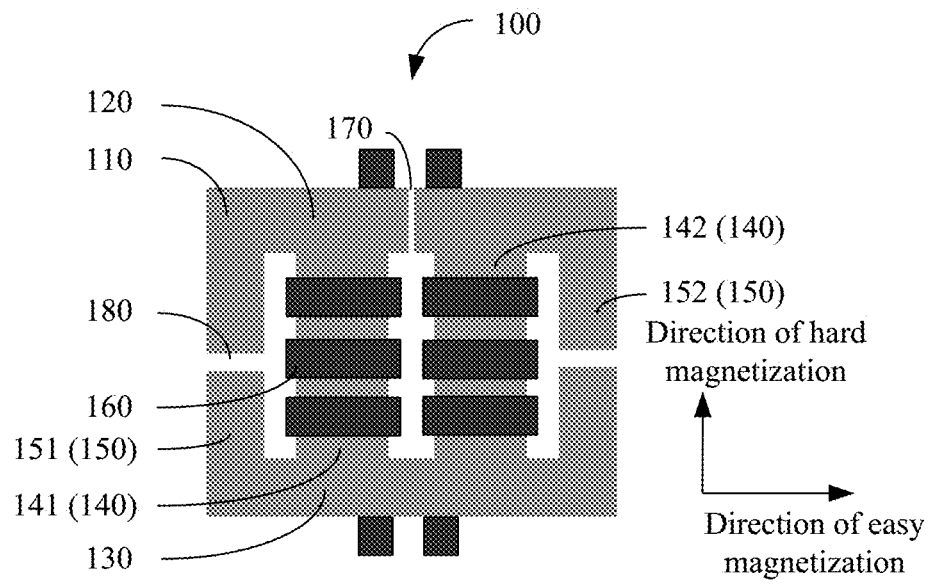
FIG. 2 is a schematic structural diagram of a thin film inductor according to another embodiment of this application.

FIG. 2 is a schematic structural diagram of a thin film inductor 100 according to another embodiment of this application.

Optionally, as shown in FIG. 2, at least one type-2 gap 180 is provided in each non-winding magnetic cylinder of each magnetic thin film. A width of the type-2 gap is greater than a width of a type-1 gap.

In this embodiment of this application, the type-2 gap is provided in the non-winding magnetic cylinder, and a value of magnetic resistance is controlled by controlling the width of the type-2 gap.

Optionally, the width $w_2$ of the type-2 gap satisfies 10 micrometers$\leq w_2 \leq$50 micrometers.

Through a simulation experiment, it is proved that when the width $w_2$ of the type-2 gap satisfies 10 micrometers$\leq w_2 <$50 micrometers, magnetic permeability of the magnetic thin film material in a direction of a hard magnetization axis can be reduced effectively, so that a magnetic core cannot be easily saturated in the direction of the hard magnetization axis.

Optionally, if the thin film magnetic core includes at least two magnetic thin films, the at least two magnetic thin films include a first magnetic thin film and a second magnetic thin film, a quantity of type-2 gaps in the first magnetic thin film is the same as a quantity of type-2 gaps in the second magnetic thin film, and the type-2 gaps in the first magnetic thin film overlap the type-2 gaps in corresponding positions in the second magnetic thin film.

Optionally, if the thin film magnetic core includes at least two magnetic thin films, each of the at least two magnetic thin films includes a same quantity of type-2 gaps, and the type-2 gaps in corresponding positions included in any two magnetic thin films in the at least two magnetic thin films overlap each other.

That is, the type-2 gaps in the magnetic thin films may partially or completely overlap each other. It should be understood that, like overlapping of type-1 gaps, overlapping of the type-2 gaps also facilitates mask fabrication and can reduce costs. Details are already described above, and are not further described herein for brevity.

Therefore, in the thin film inductor according to this embodiment of this application, the type-2 gap is provided in the non-winding magnetic cylinder to increase magnetic resistance of the non-winding magnetic cylinder, reduce magnetic permeability, and avoid magnetic core saturation in the non-winding magnetic cylinder. In addition, a value of magnetic resistance can be controlled by adjusting a size of the type-2 gap, and further, flux distribution in various magnetic cylinders (including winding magnetic cylinders and the non-winding magnetic cylinders) is adjusted to control a coupling factor between the winding magnetic cylinders (namely, inductances in various phases).

Optionally, when a plurality of magnetic cylinders include at least two winding magnetic cylinders and two non-winding magnetic cylinders, at least one type-3 gap is provided in an area located at a first end portion and a second end portion and located between a winding magnetic cylinder and a non-winding magnetic cylinder that are adjacent, and a width of the type-3 gap is less than or equal to one millimeter.

Figure 3:
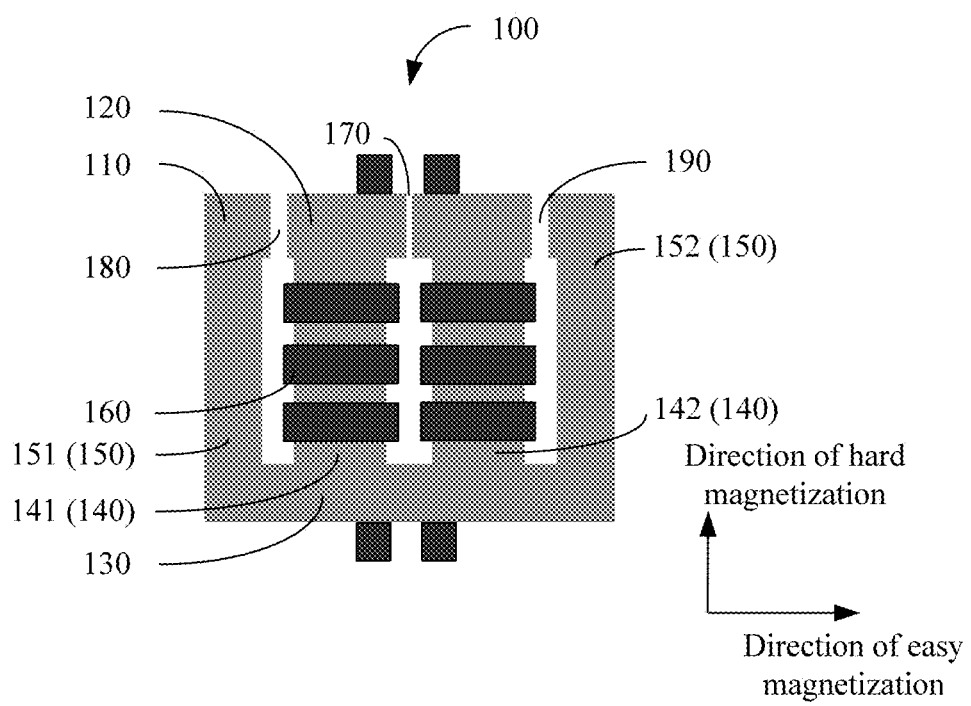
FIG. 3 is a schematic structural diagram of a thin film inductor according to still another embodiment of this application.

FIG. 3 is a schematic structural diagram of a thin film inductor 100 according to still another embodiment of this application.

As shown in FIG. 3, two non-winding magnetic cylinders 150 include a first magnetic cylinder 151 and a second magnetic cylinder 152. The first magnetic cylinder 151 and the second magnetic cylinder 152 are connected to two ends of a first end portion 120 respectively, and the first magnetic cylinder 151 and the second magnetic cylinder 152 are connected to two ends of a second end portion 130 respectively. Two winding magnetic cylinders 140 are located between the first magnetic cylinder 151 and the second magnetic cylinder 152. The two winding magnetic cylinders 140 include a third magnetic cylinder 141 and a fourth magnetic cylinder 142. The third magnetic cylinder 141 is adjacent to the first magnetic cylinder 151. The fourth magnetic cylinder 142 is adjacent to the second magnetic cylinder 152. At least one type-5 gap 180 is provided in an area located at the first end portion 120 and the second end portion 130 and located between the first magnetic cylinder 151 and the third magnetic cylinder 141. At least one type-5 gap 190 is provided in an area located at the first end portion 120 or the second end portion 130 and located between the second magnetic cylinder 152 and the fourth magnetic cylinder 142. In addition, at least one type-1 gap 170 is provided in an area located at the first end portion 120 and the second end portion 130 and located between the third magnetic cylinder 141 and the fourth magnetic cylinder 142. A width of the type-5 gap is less than or equal to one millimeter.

Optionally, the width $w_5$ of the type-5 gap satisfies 10 micrometers≤$w_5$≤50 micrometers.

Through a simulation experiment, it is found that when the width $w_5$ of the type-5 gap satisfies 10 micrometers≤$w_5$<50 micrometers, magnetic resistance of a magnetic thin film in a direction of an easy magnetization axis can be increased effectively, and an effect of reducing magnetic permeability and avoiding magnetic core saturation in a thin film magnetic core in a direction of easy magnetization is the best.

Optionally, if the thin film magnetic core includes at least two magnetic thin films, the at least two magnetic thin films are laminated and overlap each other, and a sum of widths of all type-5 gaps in each magnetic thin film is the same.

That is, first end portions of the magnetic thin films overlap each other, second end portions of the magnetic thin films overlap each other, at least two winding magnetic cylinders of the magnetic thin films overlap each other, and at least one non-winding magnetic cylinder of the magnetic thin films overlaps each other.

Optionally, if the thin film magnetic core includes at least two magnetic thin films, the at least two magnetic thin films include a first magnetic thin film and a second magnetic thin film, a quantity of type-5 gaps in the first magnetic thin film is the same as a quantity of type-5 gaps in the second magnetic thin film, and the type-5 gaps in the first magnetic thin film overlap the type-5 gaps in corresponding positions in the second magnetic thin film.

Optionally, if the thin film magnetic core includes at least two magnetic thin films, each of the at least two magnetic thin films includes a same quantity of type-5 gaps, and the type-5 gaps in corresponding positions included in any two magnetic thin films in the at least two magnetic thin films overlap each other.

That is, the type-5 gaps in the magnetic thin films may partially or completely overlap each other. It should be understood that, like overlapping of type-1 gaps, overlapping of the type-5 gaps also facilitates mask fabrication and can reduce costs. Details are already described above, and are not further described herein for brevity.

It should be understood that, the width of the type-5 gap shown in FIG. 3 may be the same as that of the type-2 gap shown in FIG. 2, and the type-5 gap has a function similar to that of the type-2 gap, and both are used to avoid magnetic core saturation in the non-winding magnetic cylinder and adjust flux distribution in various magnetic cylinders (including the winding magnetic cylinders and the non-winding magnetic cylinders) by controlling a value of magnetic resistance, so as to control a coupling factor between the winding magnetic cylinders (namely, inductances in various phases). "Second" and "fifth" are used merely for distinguishing positions of gaps, and should not be construed as any limitation on this application. It should also be understood that, both the type-2 gap and the type-5 gap may be provided in the non-winding magnetic cylinder and the first end portion and the second end portion respectively. The value of magnetic resistance is adjusted by simultaneously controlling the widths of the type-2 gap and the type-5 gap to control the coupling factor between inductances in various phases.

Figure 4:
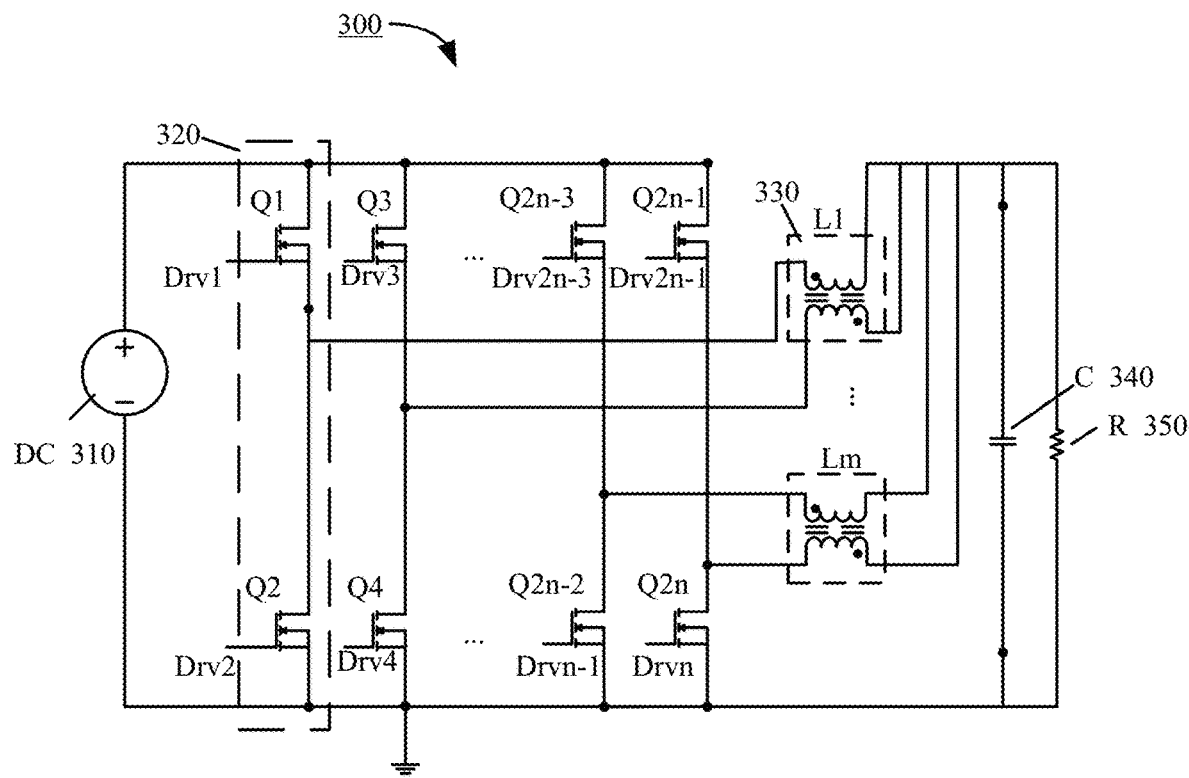
FIG. 4 is a schematic diagram of a power conversion system according to an embodiment of this application.
Figure 5:
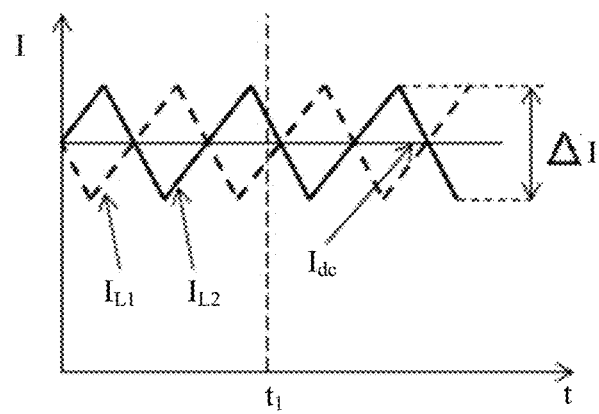
FIG. 5 is a current waveform graph when an induction unit works normally.
Figure 6A:
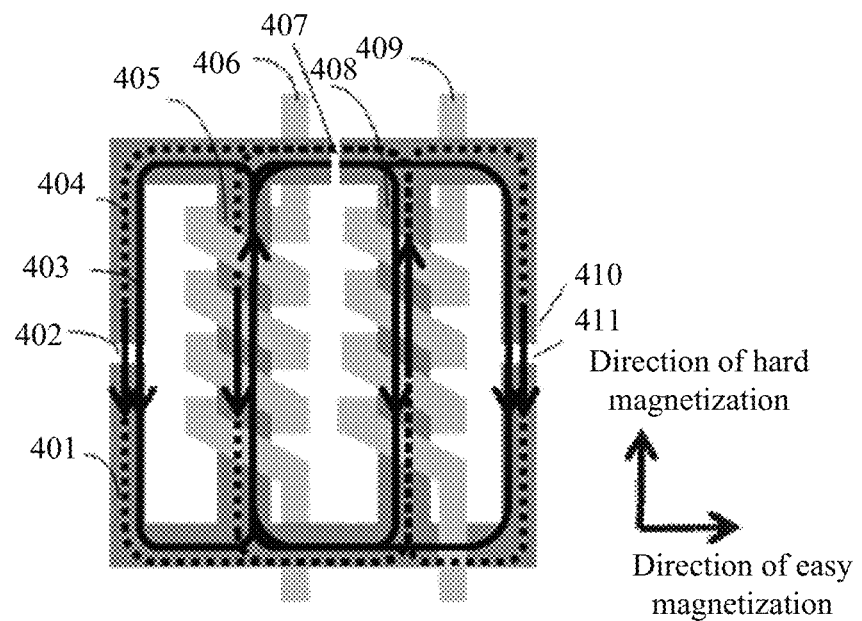
FIG. 6A and FIG. 6B are schematic diagrams of fluxes generated in magnetic cylinders when an induction unit works normally.
Figure 6B:
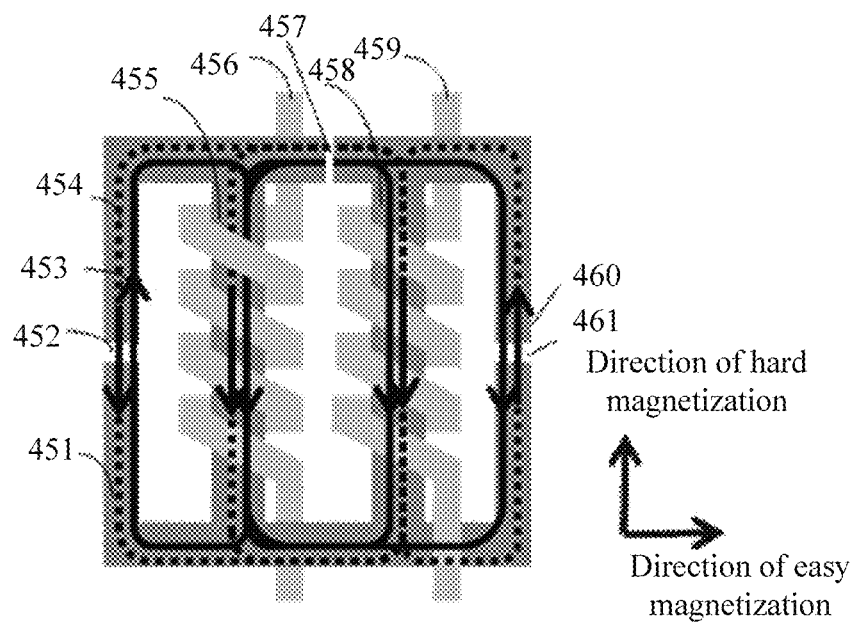

Using the thin film inductor shown in FIG. 2 as an example, the following describes in detail an operating principle of the thin film inductor in a power conversion system according to an embodiment of this application with reference to FIG. 4 to FIG. 6 (including FIG. 6A and FIG. 6B).

FIG. 4 is a schematic diagram of a power conversion system 300 according to an embodiment of this application.

As shown in FIG. 4, the power conversion system 300 includes a DC source 310, at least one switching unit 320, at least one induction unit 330, a filter capacitor 340, and a load 350. A circuit of the power conversion system is a multiphase interleaved buck (BUCK) circuit. Inductances in every two phases are coupled to form an induction unit, and one or a plurality of induction units connected in parallel output energy to the load. Two switching transistors connected in series (for example, switching transistors Q1 and Q2) form a switching unit. Each switching transistor is connected to a control IC by a drive (DRV) to control the switching transistor to be turned on and turned off. At least one switching unit corresponds to at least one induction unit on a one-to-one basis, and each induction unit is connected to the DC power source by a corresponding switching unit. The induction unit may include the thin film inductor described earlier and later.

Using an induction unit (namely, a two-phase inductor, for example, L1 in FIG. 4) as an example for ease of understanding and description, the following describes an operating principle of the induction unit in detail.

A first-phase power conversion circuit is formed by a first switching unit (for example, a switching unit formed by the switching transistors Q1 and Q2) and one phase of a first induction unit (for example, an inductor L1). When the switching transistor Q1 is turned on, a DC passes through a phase of the induction unit that is connected to the switching transistor Q1, and an induced current starts to rise and supplies power to the load R after being filtered by the capacitor C. After the Q1 is turned off, the Q2 is turned on, a voltage on the filter capacitor is reversely applied to the inductor, and the induced current starts to decrease and is freewheeled in the buck conversion circuit. Likewise, a second-phase power conversion circuit is formed by switching transistors Q3 and Q4 and another phase of the induction unit L1. When the switching transistor Q3 is turned on, a DC passes through another phase of the induction unit that is connected to the switching transistor Q4, and an induced current starts to rise and supplies power to the load R after being filtered by the capacitor C. After the Q3 is turned off, the Q4 starts to be turned on, a voltage on the filter capacitor is reversely applied to the inductor, and the induced current starts to decrease and is freewheeled in the buck conversion circuit. The foregoing two-phase buck power conversion parts Q1, Q2, Q3, and Q4, and the induction unit L1 form a power conversion unit. By analogy, Q2n-3, Q2n-2, Q2n-1, Q2n, and an induction unit Lm form a power conversion unit. According to a requirement of the output load for the current, one or a plurality of power conversion units connected in parallel may be used for implementation.

It should be understood that, the foregoing illustrated multiphase interleaved buck (BUCK) circuit is described merely as an example, and should not be construed as any limitation on this application. For example, the thin film inductor in this embodiment of this application may be further applied to a multiphase interleaved boost circuit. This is not particularly limited in this application.

FIG. 5 is a current waveform graph when the induction unit L1 works normally. As shown in FIG. 5, $I_{L1}$ is a waveform of an induced current in a first phase, and $I_{L2}$ is a waveform of an induced current in a second phase. Values of $I_{L1}$ and $I_{L2}$ are the same, and a phase difference is 180°. The induced current in each phase includes both a DC component $I_{dc}$, and an alternating current component (namely, a ripple current) ΔI.

FIG. 6A and FIG. 6B are schematic diagrams of fluxes generated in magnetic cylinders when an induction unit L1 works normally.

FIG. 6A is a schematic diagram of fluxes generated in magnetic cylinders when a DC component $I_{dc}$ passes through an induction unit L1. As shown in FIG. 6A, in the induction unit L1, a first magnetic cylinder 401, a second magnetic cylinder 410, a third magnetic cylinder 405, and a fourth magnetic cylinder 408 are arranged in parallel in a direction of easy magnetization. A type-1 gap 407 is located at a first end portion, and is located in an area between the third magnetic cylinder 405 and the fourth magnetic cylinder. A first winding 406 winds around the third magnetic cylinder 405, and a second winding 409 winds around the fourth magnetic cylinder 408. A type-2 gap 402 is located in the first magnetic cylinder 401, and a type-2 gap 411 is located in the second magnetic cylinder 410. When DCs (for example, $I_{dc}$ in FIG. 5) in a same direction pass through the first winding 406 and the second winding 409, a DC flux 403 generated by the first winding 406 in a magnetic core is circulated in the magnetic cylinders in directions shown in FIG. 6A. As can be seen, a direction of the DC flux generated in the magnetic cylinder 405 that the first winding 406 winds around is opposite to directions in the other three magnetic cylinders. A DC flux 404 generated by the second winding 409 in the magnetic core is circulated in the magnetic cylinders in directions shown in FIG. 6A. As can be seen, a direction of the flux generated in the magnetic cylinder 408 that the second winding 409 winds around is opposite to directions in the other three magnetic cylinders. Because quantities of coil turns of the two windings are the same, values of the fluxes generated in the two magnetic cylinders are the same. The DC fluxes generated by the first winding 406 and the second winding 409 have opposite positions in the third magnetic cylinder 405 and the fourth magnetic cylinder 408, and can be completely canceled because their values are the same. The DC fluxes generated by the first winding 406 and the second winding 409 have the same direction in the first magnetic cylinder 401 and the second magnetic cylinder 410, and are mutually intensified. Therefore, the type-2 gaps 402 and 411 are required to increase magnetic resistance of a magnetic circuit, and avoid magnetic core saturation in the first magnetic cylinder 401 and the second magnetic cylinder 410. In addition, by adjusting sizes of the type-2 gaps 402 and 411, the DC fluxes flowing into the magnetic cylinders can be controlled, that is, a proportion of fluxes allocated to the magnetic cylinders is adjusted to control a mutual inductance between the magnetic cylinders and finally control a coupling factor between inductances in two phases.

FIG. 6b is a schematic diagram of fluxes generated in magnetic cylinders when an alternating current component AI passes through an induction unit L1. As shown in FIG. 6b, in the induction unit, a first magnetic cylinder 451, a second magnetic cylinder 460, a third magnetic cylinder 455, and a fourth magnetic cylinder 458 are arranged in parallel. A type-1 gap 457 is located in any position in an intersection of the third magnetic cylinder 455, the fourth magnetic cylinder 458, and a first end portion. A first winding 456 winds around the third magnetic cylinder 455, and a second winding 459 winds around the fourth magnetic cylinder 458. A type-2 gap 452 is located in the first magnetic cylinder 451, and a type-2 gap 461 is located in the second magnetic cylinder 460. When alternating currents (for example, ΔI in FIG. 5) in a same direction pass through the first winding 456 and the second winding 459, an alternating current flux 453 generated by the first winding 456 in a magnetic core is circulated in the magnetic cylinders in directions shown in FIG. 6*b*. As can be seen, a direction of the alternating current flux generated in the magnetic cylinder 455 that the first winding 406 winds around is opposite to directions in the other three magnetic cylinders. A DC flux 404 generated by the second winding 409 in the magnetic core is circulated in the magnetic cylinders in directions shown in FIG. 6A. As can be seen, a direction of the flux generated in the magnetic cylinder 408 that the second winding 409 winds around is opposite to directions in the other three magnetic cylinders. Because quantities of coil turns of the two windings are the same, values of the fluxes generated in the two magnetic cylinders are the same. The alternating current fluxes generated by the first winding 456 and the second winding 459 have the same direction in the third magnetic cylinder 455 and the fourth magnetic cylinder 458, and are mutually intensified because their values are the same. The alternating current fluxes have opposite directions in the first magnetic cylinder 451 and the second magnetic cylinder 460, and are mutually canceled.

Further, as can be seen from FIG. 6 (including FIG. 6A and FIG. 6B), at the first end portion and a second end portion between the third magnetic cylinder and the fourth magnetic cylinder, cases of mutual cancellation of DC fluxes and mutual intensification of alternating current fluxes also exist. The type-1 gap 407 shown in FIG. 6A or the type-1 gap 457 shown in FIG. 6B may be used to increase magnetic resistance, reduce magnetic permeability, and avoid magnetic core saturation that may be caused by superposition of alternating current fluxes. It should be noted that, in the current waveform graph when the induction unit L1 works normally as shown in FIG. 5, the DC component and the alternating current component pass through a winding simultaneously, and fluxes generated by different current components are shown in FIG. 6A and FIG. 6B respectively. That is, a flux of the induction unit L1 in each magnetic cylinder may be understood as superposition of fluxes in FIG. 6A and FIG. 6B.

In addition, in the current waveform graph, a proportion of DC components is relatively large. Therefore, in the schematic diagrams of fluxes shown in FIG. 6A and FIG. 6B, a proportion of DC fluxes is relatively large. However, due to mutual cancellation of DC fluxes in a winding magnetic cylinder, an effective area of a magnetic core of the winding magnetic cylinder is reduced, that is, a volume (area or height) of the inductor is reduced. In addition, DC fluxes that are mutually intensified are diverted to a non-winding magnetic cylinder, and a type-2 gap in the non-winding magnetic cylinder is used to avoid magnetic core saturation in the non-winding magnetic cylinder.

Still further, the type-1 gap may be used to resolve a problem of non-constant currents between multiphase inductors.

In actual work, currents are not completely symmetric in two phases of each induction unit. At a work time of a power source, a current jump may occur, that is, asymmetric currents are generated. That is, currents in the two phases cannot be completely canceled. A current that cannot be completely canceled is circulated along a shortest path, and forms a loop in two magnetic cylinders (namely, the third magnetic cylinder and the fourth magnetic cylinder) that windings wind around, that is, a short circuit. However, magnetic resistance of the magnetic cylinders is very small, and magnetic core saturation may be easily caused. The type-1 gap may be provided at the first end portion or the second end portion between the third magnetic cylinder and the fourth magnetic cylinder to increase magnetic resistance, reduce magnetic permeability, and avoid magnetic core saturation caused by the current jump.

It should be understood that, the quantity and arrangement of the non-winding magnetic cylinders and winding magnetic cylinders shown in FIG. 1 to FIG. 6 (including FIG. 6A and FIG. 6B), and distribution of fluxes in the magnetic cylinders are described merely as an example, and should not be construed as any limitation on this application. For example, a non-winding magnetic cylinder quantity may also be 1, or the non-winding magnetic cylinder may be located between the winding magnetic cylinders. This is not particularly limited in this application.

Figure 7:
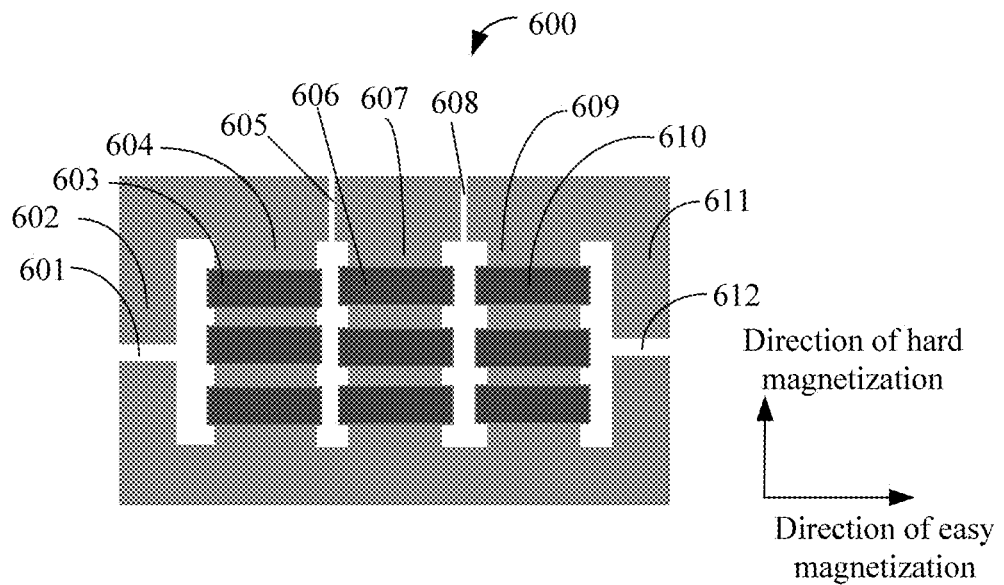
FIG. 7 is a schematic structural diagram of a thin film inductor according to yet another embodiment of this application.

FIG. 7 is a schematic structural diagram of a thin film inductor 600 according to yet another embodiment of this application.

Optionally, in this embodiment of this application, N may be a natural number greater than 2. As shown in FIG. 7, the thin film inductor 600 includes a firs end portion, a second end portion, and two non-winding magnetic cylinders (namely, a first magnetic cylinder 602 and a second magnetic cylinder 611), three winding magnetic cylinders (namely, a third magnetic cylinder 604, a fourth magnetic cylinder 607, and a fifth magnetic cylinder 609). A type-2 gap 601 is provided in the first magnetic cylinder 602. A type-2 gap 612 is provided in the second magnetic cylinder 611. A winding 603 winds around the third magnetic cylinder 604. A winding 606 winds around the fourth magnetic cylinder 607. A winding 610 winds around the fifth magnetic cylinder 609. A type-1 gap 605 is provided in an area located at the first end portion and located between the third magnetic cylinder 604 and the fourth magnetic cylinder 607. A type-1 gap 608 is provided in an area located at the first end portion and located between the fourth magnetic cylinder 607 and the fifth magnetic cylinder 609.

That is, in this embodiment of this application, a plurality of magnetic cylinders include three winding magnetic cylinders and two non-winding magnetic cylinders. That is, the induction unit shown in FIG. 4 is a three-phase inductor, where three windings wind around the three winding magnetic cylinders respectively, quantities of windings are the same, and winding directions are the same. That is, values of induced currents in three phases are the same, and a difference between every two phases is 120°.

It should be understood that, a distribution graph of fluxes in the thin film inductor shown in FIG. 7 is similar to the distribution graph of fluxes shown in FIG. 6 (including FIG. 6A and FIG. 6B), and is not further described herein for brevity.

Therefore, in the thin film inductor according to this embodiment of this application, a type-1 gap is provided in the area between adjacent winding magnetic cylinders at the first end portion or the second end portion (namely, a direction of easy magnetization), such that magnetic permeability in the direction of easy magnetization is reduced, and that a magnetic core is not easily saturated. A non-winding magnetic cylinder is connected to a winding magnetic cylinder in parallel to divert a part of a flux in a direction of hard magnetization to the non-winding magnetic cylinder. A type-2 gap is provided in the non-winding magnetic cylinder to increase magnetic resistance of the non-winding magnetic cylinder, reduce magnetic permeability, and avoid magnetic core saturation in the non-winding magnetic cylinder. In addition, a value of magnetic resistance can be controlled by adjusting a size of each type of gap, and further, flux distribution in various magnetic cylinders (including the winding magnetic cylinders and the non-winding magnetic cylinders) is adjusted to control a coupling factor between inductances in various phases.

Figure 8:
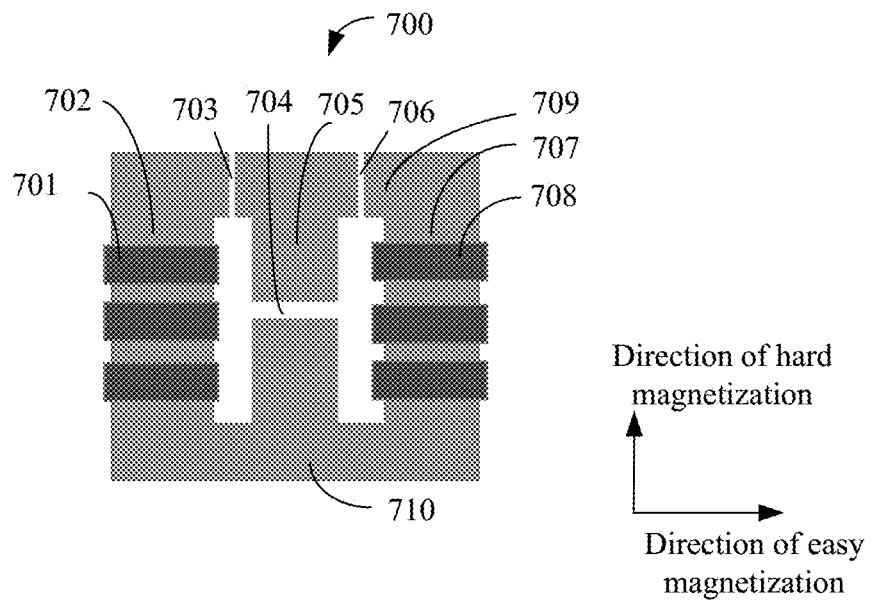
FIG. 8 is a schematic structural diagram of a thin film inductor according to yet another embodiment of this application.

FIG. 8 is a schematic structural diagram of a thin film inductor 700 according to yet another embodiment of this application.

In an embodiment, the thin film inductor 700 includes a thin film magnetic core, and the thin film magnetic core includes a plurality of magnetic cylinders, a first end portion, and a second end portion opposite to the first end portion. The plurality of magnetic cylinders are separated from each other, and are rod-shaped. The plurality of magnetic cylinders include two winding magnetic cylinders and at least one non-winding magnetic cylinder. As shown in FIG. 8, the plurality of magnetic cylinders include winding magnetic cylinders (including a third magnetic cylinder 702 and a fourth magnetic cylinder 707) and a non-winding magnetic cylinder 705. The third magnetic cylinder 702 and the fourth magnetic cylinder 707 are in contact with two ends of a first end portion 709 respectively, and the third magnetic cylinder 702 and the fourth magnetic cylinder 707 are in contact with two ends of a second end portion 710 respectively. The non-winding magnetic cylinder 705 is located between the third magnetic cylinder 702 and the fourth magnetic cylinder 707.

The thin film magnetic core includes at least one magnetic thin film. In each magnetic thin film, at least one type-3 gap is provided in an area located at the first end portion and the second end portion and located between a winding magnetic cylinder and a non-winding magnetic cylinder that are adjacent. A length direction of the type-3 gap is parallel to a direction of hard magnetization of the magnetic thin film, and the type-3 gap passes through the area of the magnetic thin film located at the first end portion or the second end portion in the length direction of the type-3 gap. A width $w_3$ of the type-3 gap is less than or equal to 100 micrometers.

If the thin film magnetic core includes at least two magnetic thin films, the at least two magnetic thin films are laminated and overlap each other, and a sum of widths of all type-3 gaps in each magnetic thin film is the same.

Optionally, in each magnetic thin film, at least two type-3 gaps are provided in the area located at the first end portion or the second end portion and located between the winding magnetic cylinder and the non-winding magnetic cylinder that are adjacent.

That is, a type-3 gap quantity may be one or more. A value of magnetic resistance can be adjusted by separately controlling a width of one type-3 gap or simultaneously controlling widths of a plurality of type-3 gaps, and further, flux distribution in various magnetic cylinders is controlled to control a coupling factor between inductances in various phases.

Optionally, the width $w_3$ of the type-3 gap is less than or equal to 10 micrometers.

Through a simulation experiment, it is found that when the width $w_3$ of the type-3 gap is less than or equal to 10 micrometers, an effect of reducing magnetic permeability and avoiding magnetic core saturation in the thin film magnetic core in a direction of easy magnetization is the best.

It should be noted that, the width of the type-3 gap that is illustrated earlier is a distance in a direction vertical to the length direction of the type-3 gap, that is, may be understood as an interplanar distance between two end faces that are opposite.

Optionally, the first end portion is parallel to the second end portion.

Optionally, the plurality of magnetic cylinders are parallel to each other.

Optionally, each magnetic cylinder is vertical to the first end portion of the thin film magnetic core.

Optionally, distances between every two adjacent magnetic cylinders are the same.

Optionally, the thin film inductor further includes windings, a quantity of the windings is equal to a quantity of at least two winding magnetic cylinders, each winding winds around one winding magnetic cylinder, and winding directions of all the windings are the same.

Optionally, if the thin film magnetic core includes at least two magnetic thin films, each magnetic thin film is made of a same material.

Further, connecting a non-winding magnetic cylinder to a winding magnetic cylinder in parallel is equivalent to diverting a part of an alternating current flux in the winding magnetic cylinder to the non-winding magnetic cylinder. DC fluxes generated by windings in non-winding magnetic cylinders are mutually intensified, but DC fluxes generated in winding magnetic cylinders are mutually canceled (distribution and directions of the fluxes in the winding magnetic cylinders and the non-winding magnetic cylinders are described in detail later). Therefore, a risk of magnetic core saturation in a winding magnetic cylinder area can be reduced.

Optionally, if the thin film magnetic core includes at least two magnetic thin films, the at least two magnetic thin films include a first magnetic thin film and a second magnetic thin film, a quantity of type-3 gaps in the first magnetic thin film is the same as a quantity of type-3 gaps in the second magnetic thin film, and the type-3 gaps in the first magnetic thin film overlap the type-3 gaps in corresponding positions in the second magnetic thin film.

Optionally, if the thin film magnetic core includes at least two magnetic thin films, each of the at least two magnetic thin films includes a same quantity of type-3 gaps, and the type-3 gaps in corresponding positions included in any two magnetic thin films in the at least two magnetic thin films overlap each other.

That is, the type-3 gaps in the magnetic thin films may partially or completely overlap each other. It should be understood that, like overlapping of type-1 gaps, overlapping of the type-3 gaps also facilitates mask fabrication and can reduce costs. Details are already described above, and are not further described herein for brevity.

Optionally, when the plurality of magnetic cylinders include one non-winding magnetic cylinder, at least one type-4 gap is provided in the non-winding magnetic cylinder; or when the plurality of magnetic cylinders include two non-winding magnetic cylinders, at least one type-4 gap is provided in the two non-winding magnetic cylinders; where a width $w_4$ of the type-4 gap is less than or equal to one millimeter.

The type-4 gap is provided in the non-winding magnetic cylinder to increase magnetic resistance of the non-winding magnetic cylinder, reduce magnetic permeability, and avoid magnetic core saturation in the non-winding magnetic cylinder. In addition, a value of magnetic resistance can be controlled by adjusting a size of each type of gap, and further, flux distribution in various magnetic cylinders (including the winding magnetic cylinders and the non-winding magnetic cylinders) is adjusted to control a coupling factor between inductances in various phases.

Optionally, the width $w_4$ of the type-4 gap satisfies 10 micrometers≤$w_2$≤50 micrometers.

Through a simulation experiment, it is found that when the width $w_4$ of the type-4 gap satisfies 10 micrometers≤$w_2$<50 micrometers, an effect of reducing magnetic permeability, avoiding magnetic core saturation in the non-winding magnetic cylinder, and controlling the coupling factor is the best.

Optionally, if the thin film magnetic core includes at least two magnetic thin films, the at least two magnetic thin films include a first magnetic thin film and a second magnetic thin film, a quantity of type-4 gaps in the first magnetic thin film is the same as a quantity of type-4 gaps in the second magnetic thin film, and the type-4 gaps in the first magnetic thin film overlap the type-4 gaps in corresponding positions in the second magnetic thin film.

Optionally, if the thin film magnetic core includes at least two magnetic thin films, each of the at least two magnetic thin films includes a same quantity of type-4 gaps, and the type-4 gaps in corresponding positions included in any two magnetic thin films in the at least two magnetic thin films overlap each other.

That is, the type-4 gaps in the magnetic thin films may partially or completely overlap each other. It should be understood that, like overlapping of type-1 gaps, overlapping of the type-4 gaps also facilitates mask fabrication and can reduce costs. Details are already described above, and are not further described herein for brevity.

The following describes in detail distribution of fluxes generated in magnetic cylinders when a thin film inductor used in a power conversion system works normally according to yet another embodiment of this application.

Figure 9A:
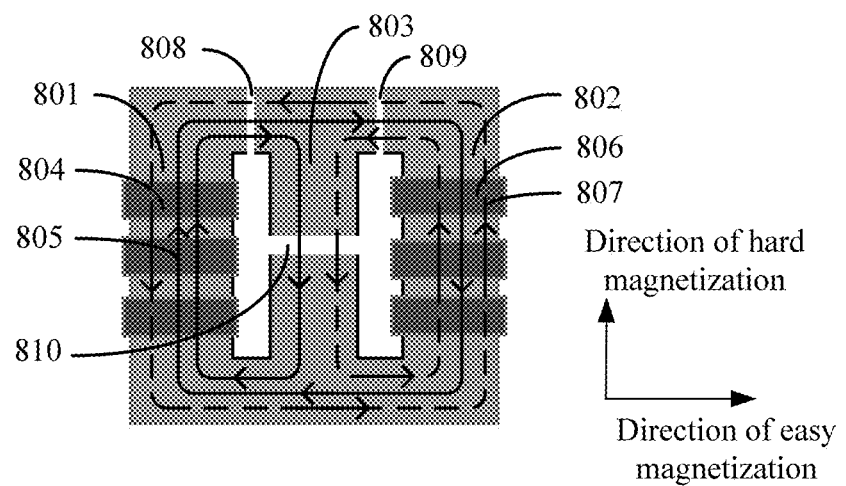
FIG. 9A and FIG. 9B are schematic diagrams of fluxes generated in magnetic cylinders when an induction unit works normally.
Figure 9B:
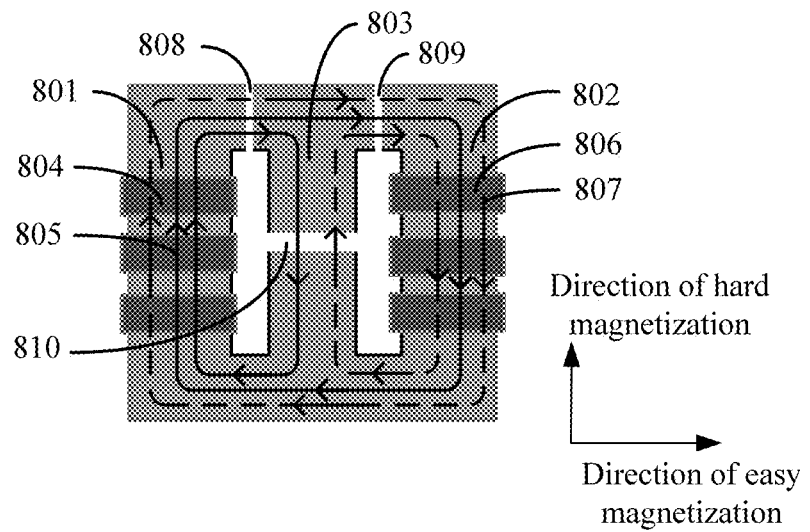

FIG. 9A and FIG. 9B are schematic diagrams of fluxes generated in magnetic cylinders when a magnetic film inductor used in a power conversion system works normally according to yet another embodiment of this application. That is, the magnetic film inductor may be understood as the induction unit L1 in FIG. 4. A current waveform graph when the induction unit L1 works normally is shown in FIG. 5.

As shown in FIG. 9A, FIG. 9A is a schematic diagram of fluxes generated in magnetic cylinders when a DC component $I_{dc}$ passes through an induction unit. As shown in FIG. 9A, in the induction unit L1, winding magnetic cylinders (including a third magnetic cylinder 801 and a fourth magnetic cylinder 802) and a non-winding magnetic cylinder 803 are arranged in parallel in a direction of easy magnetization. A type-1 gap 808 is located at a first end portion, and is located in an area between the third magnetic cylinder 801 and the non-winding magnetic cylinder 803. A type-1 gap 809 is located at the first end portion, and is located in an area between the fourth magnetic cylinder 802 and the non-winding magnetic cylinder 803. A first winding 804 winds around the third magnetic cylinder 801, and a second winding 806 winds around the fourth magnetic cylinder 802. A type-2 gap 810 is located in the non-winding magnetic cylinder 803. When DCs (for example, $I_{dc}$ in FIG. 5) in a same direction pass through the first winding 804 and the second winding 806, a DC flux 805 generated by the first winding 804 in a magnetic core is circulated in the magnetic cylinders in directions shown in FIG. 9A. As can be seen, a direction of the flux generated in the third magnetic cylinder 801 that the first winding 804 winds around is opposite to directions in the other two magnetic cylinders. A DC flux 807 generated by the second winding 806 in the magnetic core is circulated in the magnetic cylinders in directions shown in FIG. 9A. As can be seen, a direction of the flux generated in the fourth magnetic cylinder 802 that the second winding 806 winds around is opposite to directions in the other two magnetic cylinders. Because quantities of coil turns of the two windings are the same, values of the fluxes generated in the two magnetic cylinders are the same. The DC fluxes generated by the first winding 804 and the second winding 806 have opposite DC flux directions and same values at the first end portion and a second end portion, and can be completely canceled. The DC fluxes generated by the first winding 804 and the second winding 806 have the same direction and same values in the non-winding magnetic cylinder 803, and can be mutually intensified. Therefore, the type-2 gap 810 is required to increase magnetic resistance of a magnetic circuit, and avoid magnetic core saturation in the non-winding magnetic cylinder 803. In addition, by adjusting a size of the type-2 gap 810, volumes of the DC fluxes flowing into the magnetic cylinders can be controlled, that is, a proportion of fluxes allocated to the magnetic cylinders is adjusted to control a mutual inductance between the magnetic cylinders and finally control a coupling factor between inductances in two phases.

FIG. 9B is a schematic diagram of fluxes generated in magnetic cylinders when an alternating current component AI passes through an induction unit. As shown in FIG. 9B, in the induction unit L1, winding magnetic cylinders (including a third magnetic cylinder 801 and a fourth magnetic cylinder 802) and a non-winding magnetic cylinder 803 are arranged in parallel. A type-1 gap 808 is located at a first end portion, and is located in an area between the third magnetic cylinder 801 and the non-winding magnetic cylinder 803. A first gap 809 is located at the first end portion, and is located in an area between the fourth magnetic cylinder 802 and the non-winding magnetic cylinder 803. A first winding 804 winds around the third magnetic cylinder 801, and a second winding 806 winds around the fourth magnetic cylinder 802. A type-2 gap 810 is located in the non-winding magnetic cylinder 803. When alternating currents (for example, ΔI in FIG. 5) in a same direction pass through the first winding 804 and the second winding 806, an alternating current flux 805 generated by the first winding 804 in a magnetic core is circulated in the magnetic cylinders in directions shown in FIG. 9A. As can be seen, a direction of the flux generated in the third magnetic cylinder 801 that the first winding 804 winds around is opposite to directions in the other two magnetic cylinders. An alternating current flux 807 generated by the second winding 806 in the magnetic core is circulated in the magnetic cylinders in directions shown in FIG. 9B. As can be seen, a direction of the flux generated in the magnetic cylinder 802 that the second winding 806 winds around is opposite to directions in the other two magnetic cylinders. Because quantities of coil turns of the two windings are the same, values of the fluxes generated in the two magnetic cylinders are the same. The alternating current fluxes generated by the first winding 804 and the second winding 806 have opposite directions and same values in the non-winding magnetic cylinder 803, and can be completely canceled. The alternating current fluxes generated by the first winding 804 and the second winding 806 have the same direction at the first end portion and a second end portion, and can be mutually intensified. Therefore, the first gap 808 and the type-1 gap 809 are required to increase magnetic resistance of a magnetic circuit, and avoid magnetic core saturation at the first end portion and the second end portion in a direction of easy magnetization.

In the embodiments of this application, the type-3 gap is provided in the direction of easy magnetization between inductances in two phases. This can increase magnetic resistance, reduce magnetic permeability, and avoid magnetic core saturation in the direction of easy magnetization. In addition, the DC flux in the winding magnetic cylinder is diverted to the non-winding magnetic cylinder, and the type-4 gap is provided in the non-winding magnetic cylinder to increase magnetic resistance, reduce magnetic permeability, and avoid magnetic core saturation in the direction of hard magnetization. In addition, a value of magnetic resistance can be controlled by adjusting a size of each type of gap, and further, flux distribution in various magnetic cylinders (including the winding magnetic cylinders and the non-winding magnetic cylinders) is adjusted to control a coupling factor between inductances in two phases.

It should be understood that, the widths of the type-1 gap, the type-2 gap, the type-3 gap, the type-4 gap, and the type-5 gap that are illustrated above may all be understood as distances in directions vertical to length directions of various gaps, that is, may be understood as interplanar distances between two end faces of the gaps.

It should be noted that, the end faces of various gaps may be end faces vertical to a direction of flux circulation, or may be end faces inclined to a direction of flux circulation. The end faces are smooth end faces, stepwise end faces, slope end faces, or end faces of other structures. This is not particularly limited in this application. As long as various gaps are gaps passing through positions (for example, the first end portion, the second end portion, or the non-winding magnetic cylinder), the gaps shall all fall within the protection scope of this application.

The foregoing describes in detail the thin film inductors according to the embodiments of this application with reference to FIG. 1 to FIG. 9 (including FIG. 9A and FIG. 9B). The following describes in detail a method for fabricating a thin film inductor according to an embodiment of this application with reference to FIG. 10 and FIG. 11 (including FIG. 11A to FIG. 11E).

Figure 10:
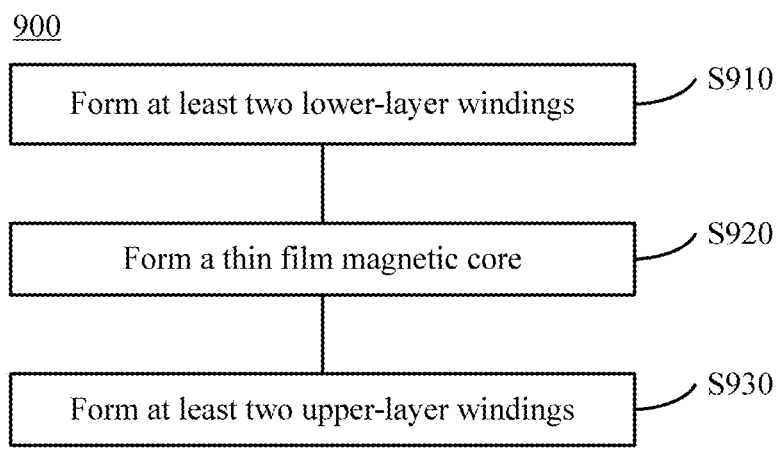
FIG. 10 is a schematic flowchart of a method for fabricating a thin film inductor according to an embodiment of this application.

FIG. 10 is a schematic flowchart of a method 900 for fabricating a thin film inductor according to an embodiment of this application. As shown in FIG. 10, the fabrication method 900 includes the following steps.

S910. Form at least two lower-layer windings.

S920. Form a thin film magnetic core, where the thin film magnetic core includes a plurality of magnetic cylinders, a first end portion, and a second end portion opposite to the first end portion, the plurality of magnetic cylinders are separated from each other, the plurality of magnetic cylinders are all rod-shaped, one end of each magnetic cylinder in the plurality of magnetic cylinders is in contact with the first end portion, and the other end thereof is in contact with the second end portion; the plurality of magnetic cylinders include at least two winding magnetic cylinders and at least one non-winding magnetic cylinder; the thin film magnetic core includes at least one magnetic thin film, and in each magnetic thin film, at least one type-1 gap is provided in an area located at the first end portion and the second end portion and located between two adjacent winding magnetic cylinders, where a length direction of the type-1 gap is parallel to a direction of hard magnetization of the magnetic thin film, the type-1 gap passes through the first end portion or the second end portion of the magnetic thin film in the length direction of the type-1 gap, and a width $w_1$ of the type-1 gap is less than or equal to 100 micrometers; or in each magnetic thin film, at least one type-3 gap is provided in an area located at the first end portion and the second end portion and located between a winding magnetic cylinder and a non-winding magnetic cylinder that are adjacent, where a length direction of the type-3 gap is parallel to a direction of hard magnetization of the magnetic thin film, the type-3 gap passes through the first end portion or the second end portion of the magnetic thin film in the length direction of the type-3 gap, and a width $w_3$ of the type-3 gap is less than or equal to 100 micrometers; and if the thin film magnetic core includes at least two magnetic thin films, the at least two magnetic thin films are laminated and overlap each other, and a sum of widths of all type-1 gaps in each magnetic thin film is the same.

S930. Form at least two upper-layer windings, where the at least two lower-layer windings correspond to the at least two upper-layer windings on a one-to-one basis, the at least two lower-layer windings and the at least two upper-layer windings form at least two windings, the at least two windings wind around the at least two winding magnetic cylinders respectively, the at least two windings correspond to the at least two winding magnetic cylinders on a one-to-one basis, and winding directions of all the windings are the same.

The following describes in detail a method for fabricating a thin film inductor according to an embodiment of this application with reference to FIG. 11A to FIG. 11E.

FIG. 11A to FIG. 11E are schematic diagrams of a method for fabricating a thin film inductor 100 according to an embodiment of this application.

Figure 11A:
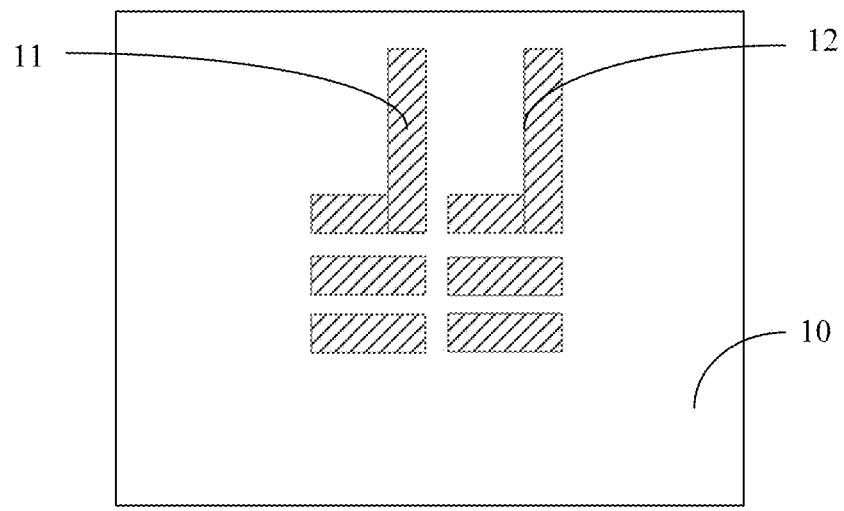
FIG. 11A to FIG. 11E are schematic diagrams of a method for fabricating a thin film inductor according to an embodiment of this application.

First, at least two lower-layer windings are formed on a silicon substrate. As shown in FIG. 11A, a passivation layer is deposited on a silicon body of the silicon substrate. The passivation layer may be a coating of silicon dioxide, silicon nitride, or another insulating organic material, and the passivation layer completely covers a surface of the silicon body 10. At the passivation layer, a vapor deposition process is used to deposit a conducting seed layer on a whole silicon wafer. Then a photoimagable anti-etching material layer is deposited and etched to form a photoimagable anti-etching mask that covers a part of the seed layer.

Afterward, a standard electroplating process may be used to electroplate the seed layer with lower-layer inductive winding parts 11 and 12 to form a lower-layer winding part of a two-phase inductive winding in an induction unit. After electroplating is completed, the photoimagable anti-etching mask may be removed, and the residual seed layer is removed using a reactive ion etching (RIE) method or another appropriate etching method.

Subsequently, an insulating material layer is deposited again to cover the lower-layer winding, and needs to bury the winding by a particular depth to ensure an insulation distance between the winding and a magnetic core.

Figure 11B:
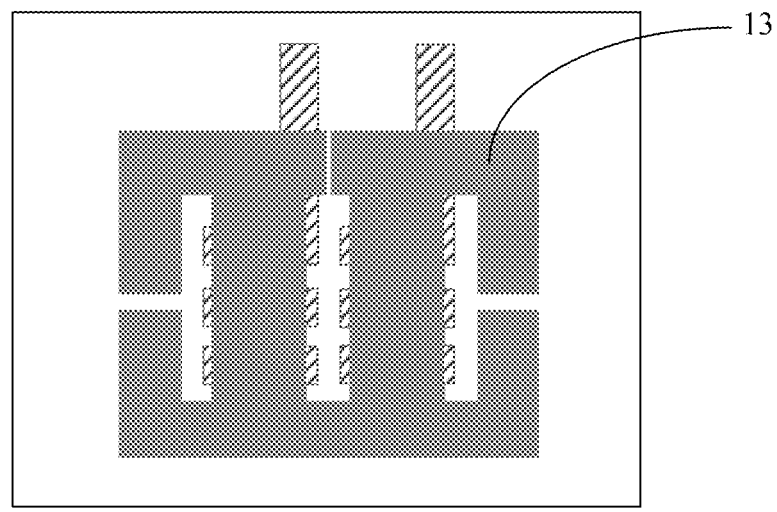

Then a thin film magnetic core 13 is formed. As shown in FIG. 11B, FIG. 11B is the silicon wafer after a magnetic film is fabricated. To achieve better induction performance, the thin film magnetic core generally includes a plurality of magnetic films. Formation of the magnetic film may be an implementation of chemical vapor deposition (CVD), physical vapor deposition (PVD), atomic layer deposition (ALD), or the like. An insulation layer is deposited between magnetic films, and a material of the insulation layer may be silicon dioxide, silicon nitride, or another insulating organic material, such that the magnetic films are isolated from each other. To reduce an eddy current loss of the magnetic film, a thickness of the magnetic film may be controlled to be less than 1 μm.

It should be noted that, in a process of magnetic film sputtering or electroplating deposition, an external magnetic field needs to be added to control anisotropism of the magnetic thin film material, and a direction of the external magnetic field needs to be a direction of an easy magnetization axis.

Figure 11C:
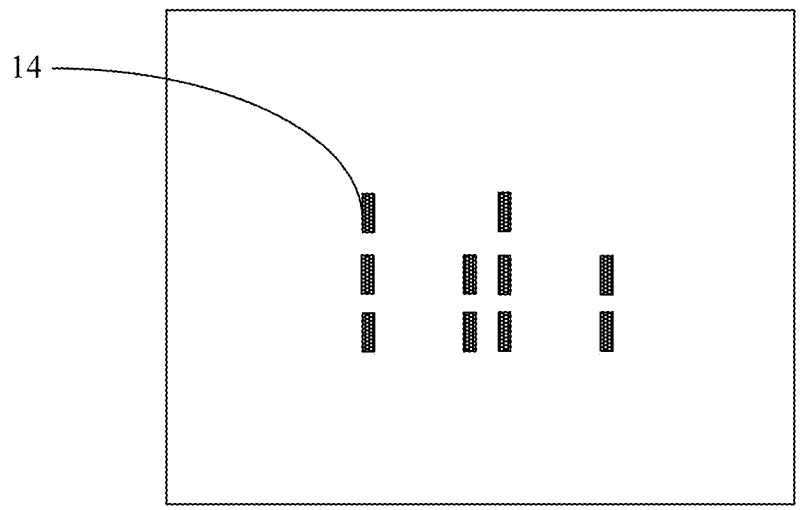

Afterward, at least two upper-layer windings are formed. FIG. 11C shows connection through-holes 14 between the at least two upper-layer windings and the at least two lower-layer windings. The at least two upper-layer windings 15 shown in FIG. 11D and the at least two lower-layer windings shown in FIG. 11A are connected by the connection through-holes to form at least two windings that wind around magnetic cylinders as shown in FIG. 11E.

Figure 11D:
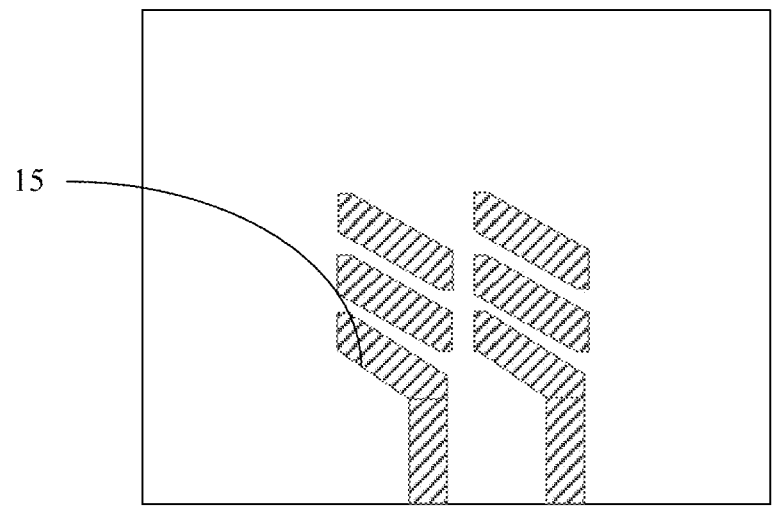
Figure 11E:
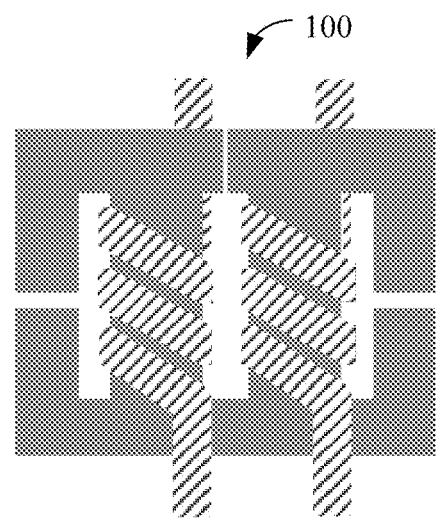

A processing technique for the at least two upper-layer windings shown in FIG. 11D is basically the same as a processing technique for the at least two lower-layer windings shown in FIG. 11A, and the standard electroplating process may be used.

Therefore, in the method for fabricating a thin film inductor according to this embodiment of this application, a type-1 gap or a type-3 gap is provided in a direction of easy magnetization, such that magnetic permeability in the direction of easy magnetization is reduced, and that the magnetic core is not easily saturated. In addition, a non-winding magnetic cylinder is connected to a winding magnetic cylinder in parallel to divert a part of a flux in the winding magnetic cylinder in a direction of hard magnetization to the non-winding magnetic cylinder. In addition, a type-2 gap or a type-4 gap is provided in the non-winding magnetic cylinder to increase magnetic resistance of the non-winding magnetic cylinder, reduce magnetic permeability, and avoid magnetic core saturation in the non-winding magnetic cylinder. In addition, a value of magnetic resistance can be controlled by adjusting a size of each type of gap, and further, flux distribution in various magnetic cylinders is adjusted to control a coupling factor between inductances in various phases.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a computer software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A thin film magnetic core of a thin film inductor, the thin film magnetic core comprising:
    a first end portion;
    a second end portion opposite to the first end portion;
    a plurality of magnetic cylinders separated from each other, the plurality of magnetic cylinders is rod-shaped, a first end of each magnetic cylinder in the plurality of magnetic cylinders is in contact with the first end portion, and a second end of each magnetic cylinder in the plurality of magnetic cylinders is in contact with the second end portion, the plurality of magnetic cylinders comprising:
       at least two winding magnetic cylinders and two non-winding magnetic cylinders, the at least two winding magnetic cylinders being located between the two non-winding magnetic cylinders; and
    at least two magnetic thin films, in each magnetic thin film, at least one type-1 gap is provided in an area located between two adjacent winding magnetic cylinders, a length direction of the type-1 gap being parallel to a direction of hard magnetization of the magnetic thin film, the type-1 gap passes through the area of the magnetic thin film located at the first end portion or the second end portion in the length direction of the type-1 gap, and a width $w_1$ of the type-1 gap is less than or equal to 100 micrometers, the at least two magnetic thin films are laminated and overlap each other, and a sum of widths of all type-1 gaps in each magnetic thin film is the same, and wherein at least one type-2 gap is provided in each of the non-winding magnetic cylinders, and a width $w_2$ of the type-2 gap is less than or equal to one millimeter.

2. The thin film magnetic core of claim 1, wherein the width $w_1$ of the type-1 gap is less than or equal to 10 micrometers.

3. The thin film magnetic core of claim 1, wherein the first end portion is parallel to the second end portion.

4. The thin film magnetic core of claim 1, wherein magnetic cylinders in the plurality of magnetic cylinders are parallel to each other.

5. The thin film magnetic core of claim 4, wherein each magnetic cylinder is vertical to the first end portion of the thin film magnetic core.

6. The thin film magnetic core of claim 1, wherein distances between every two adjacent magnetic cylinders are the same.

7. The thin film magnetic core of claim 1, wherein the thin film inductor further comprises windings, each winding winds around one winding magnetic cylinder, and winding directions of all the windings are the same.

8. The thin film inductor according to claim 1, wherein each magnetic thin film is made of a same material.

9. The thin film magnetic core of claim 1, wherein the at least two magnetic thin films comprise a first magnetic thin film and a second magnetic thin film, a quantity of type-1 gaps in the first magnetic thin film is the same as a quantity of type-1 gaps in the second magnetic thin film, and the type-1 gaps in the first magnetic thin film overlap the type-1 gaps in corresponding positions in the second magnetic thin film.

10. The thin film magnetic core of claim 9, wherein the quantity of type-1 gaps in the first magnetic thin film is greater than or equal to 1.

11. The thin film magnetic core of claim 1, wherein each of the at least two magnetic thin films comprise a same quantity of type-1 gaps, and the type-1 gaps in corresponding positions comprised in any two magnetic thin films in the at least two magnetic thin films overlap each other.

12. The thin film magnetic core of claim 1, wherein the width $w_2$ of the type-2 gap satisfies 10 micrometers$\leq w_2 \leq$50 micrometers.

13. The thin film magnetic core of claim 1, the at least two magnetic thin films comprise a first magnetic thin film and a second magnetic thin film, a quantity of type-2 gaps in the first magnetic thin film is the same as a quantity of type-2 gaps in the second magnetic thin film, and the type-2 gaps in the first magnetic thin film overlap the type-2 gaps in corresponding positions in the second magnetic thin film.

14. The thin film magnetic core of claim 1, wherein each of the at least two magnetic thin films comprise a same quantity of type-2 gaps, and the type-2 gaps in corresponding positions comprised in any two magnetic thin films in the at least two magnetic thin films overlap each other.

15. The thin film magnetic core of claim 1, wherein the at least two magnetic thin films are formed using a mask.

16. The thin film magnetic core of claim 1, wherein the two non-winding magnetic cylinders are connected to the two winding magnetic cylinders in parallel to divert a part of a flux in the two winding magnetic cylinders in a direction of hard magnetization to the two non-winding magnetic cylinders.

\* \* \* \* \*